(12) United States Patent
Shipulski et al.

(10) Patent No.: US 9,560,732 B2
(45) Date of Patent: Jan. 31, 2017

(54) HIGH ACCESS CONSUMABLES FOR A PLASMA ARC CUTTING SYSTEM

(71) Applicant: Hypertherm, Inc., Hanover, NH (US)

(72) Inventors: E. Michael Shipulski, Etna, NH (US); Nicholas A. Sanders, Enfield, NH (US); Jay Jason, Claremont, NH (US); Jonathan P. Mather, Grafton, NH (US); Peter J. Twarog, Meriden, NH (US); Clifford Glenn Darrow, Lyme, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 14/610,011

(22) Filed: Jan. 30, 2015

(65) Prior Publication Data

US 2015/0144603 A1    May 28, 2015

Related U.S. Application Data

(63) Continuation-in-part of application No. 14/513,878, filed on Oct. 14, 2014, which is a continuation-in-part
(Continued)

(51) Int. Cl.
*B23K 10/00* (2006.01)
*H05H 1/34* (2006.01)
(Continued)

(52) U.S. Cl.
CPC ............... *H05H 1/34* (2013.01); *B23K 10/00* (2013.01); *B23K 10/006* (2013.01); *B23K 35/00* (2013.01);
(Continued)

(58) Field of Classification Search
CPC .............. H05H 1/34; H05H 2001/3468; H05H 2001/3457; H05H 2001/3426; H05H 2001/3442; Y10T 29/49945; Y10T 29/49117; B23K 10/00; B23K 35/0216; B23K 35/00; B23K 10/006
(Continued)

(56) References Cited

U.S. PATENT DOCUMENTS 2,784,294 A    3/1957  Gravert
2,898,441 A    8/1959  Reed et al.
(Continued)

FOREIGN PATENT DOCUMENTS

CN    1054387 A    9/1991
CN    1083424 A    3/1994
(Continued)

OTHER PUBLICATIONS

Inner Logic® SR-45; Consumables, http://www.attcusa.com/plasma/InnerLogicSR-45i.php.
(Continued)

*Primary Examiner* — Mark Paschall
(74) *Attorney, Agent, or Firm* — Proskauer Rose LLP

(57) ABSTRACT

A nozzle for a plasma arc torch is provided. The nozzle includes a substantially hollow, elongated nozzle body capable of receiving an electrode, the body defining a longitudinal axis, a distal end, and a proximal end. The nozzle also includes a swirl sleeve attachable to an interior surface of the nozzle body, the swirl sleeve configured to impart a swirling motion to a gas introduced to the nozzle. The nozzle additionally includes a nozzle tip connected to the proximal end of the nozzle body, a nozzle shield, and an insulator configured to connect the nozzle tip and the nozzle shield to electrically insulate the nozzle shield and the nozzle tip from one another while transferring thermal energy therebetween.

29 Claims, 14 Drawing Sheets

Related U.S. Application Data of application No. 13/570,526, filed on Aug. 9, 2012, which is a continuation-in-part of application No. 13/553,273, filed on Jul. 19, 2012, application No. 14/610,011, which is a continuation-in-part of application No. 13/229,105, filed on Sep. 9, 2011, now Pat. No. 8,981,253, which is a continuation-in-part of application No. 12/878,512, filed on Sep. 9, 2010, now Pat. No. 8,624,150, and a continuation-in-part of application No. 13/169,534, filed on Jun. 27, 2011, now Pat. No. 8,153,927, which is a continuation of application No. 11/611,625, filed on Dec. 15, 2006, now Pat. No. 7,989,727, said application No. 13/229,105 is a continuation-in-part of application No. 12/032,630, filed on Feb. 15, 2008, now Pat. No. 8,089,025.

(60) Provisional application No. 62/063,703, filed on Oct. 14, 2014, provisional application No. 60/825,453, filed on Sep. 13, 2006, provisional application No. 60/901,804, filed on Feb. 16, 2007, provisional application No. 61/991,114, filed on May 9, 2014.

(51) Int. Cl.
  *B23K 35/02* (2006.01)
  *B23K 35/00* (2006.01)

(52) U.S. Cl.
  CPC ... *B23K 35/0216* (2013.01); *H05H 2001/3426* (2013.01); *H05H 2001/3442* (2013.01); *H05H 2001/3457* (2013.01); *H05H 2001/3468* (2013.01); *Y10T 29/49117* (2015.01); *Y10T 29/49945* (2015.01)

(58) Field of Classification Search
  USPC .. 219/121.5, 121.49, 121.48, 75; 315/111.21
  See application file for complete search history.

(56) References Cited

U.S. PATENT DOCUMENTS

| | | |
|---|---|---|
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning |
| 3,198,932 A | 8/1965 | Weatherly |
| 3,242,305 A | 3/1966 | Kane et al. |
| 3,534,388 A | 10/1970 | Ito et al. |
| 3,619,549 A | 11/1971 | Hogan et al. |
| 3,641,308 A | 2/1972 | Couch, Jr. et al. |
| 3,676,639 A | 7/1972 | Esiban et al. |
| 3,787,247 A | 1/1974 | Couch, Jr. |
| 3,794,806 A | 2/1974 | Klasson |
| 3,833,787 A | 9/1974 | Couch, Jr. |
| 3,930,139 A | 12/1975 | Bykhovsky et al. |
| 4,055,741 A | 10/1977 | Bykhovsky et al. |
| 4,149,052 A | 4/1979 | Piber |
| 4,514,616 A | 4/1985 | Warner |
| 4,580,032 A | 4/1986 | Carkhuff |
| 4,590,354 A | 5/1986 | Marhic et al. |
| 4,598,191 A | 7/1986 | Marhic et al. |
| 4,675,493 A | 6/1987 | Gartland et al. |
| 4,701,590 A | 10/1987 | Hatch |
| 4,781,175 A | 11/1988 | McGreevy et al. |
| 4,791,266 A | 12/1988 | Gérard |
| 4,791,268 A | 12/1988 | Sanders et al. |
| 4,841,114 A | 6/1989 | Browning |
| 4,902,871 A | 2/1990 | Sanders et al. |
| 4,940,877 A | 7/1990 | Broberg |
| 4,959,520 A | 9/1990 | Okada et al. |
| 4,967,055 A | 10/1990 | Raney et al. |
| 4,973,816 A | 11/1990 | Haberman |
| 5,013,885 A | 5/1991 | Carkhuff et al. |
| 5,039,837 A | 8/1991 | Nourbakhsh et al. |
| 5,097,111 A | 3/1992 | Severance, Jr. |
| 5,132,512 A | 7/1992 | Sanders et al. |
| 5,132,513 A | 7/1992 | Ingwersen et al. |
| 5,164,569 A | 11/1992 | Porra et al. |
| 5,170,033 A | 12/1992 | Couch, Jr. et al. |
| 5,208,441 A | 5/1993 | Broberg |
| 5,216,221 A | 6/1993 | Carkhuff |
| 5,223,686 A | 6/1993 | Benway et al. |
| 5,260,546 A | 11/1993 | Ingwersen et al. |
| 5,308,949 A | 5/1994 | Reed, Jr. et al. |
| 5,310,988 A | 5/1994 | Couch, Jr. et al. |
| 5,317,126 A | 5/1994 | Couch, Jr. et al. |
| 5,328,516 A | 7/1994 | Dietiker |
| 5,338,917 A | 8/1994 | Stuart et al. |
| 5,393,952 A | 2/1995 | Yamaguchi et al. |
| 5,449,206 A | 9/1995 | Lockwood |
| 5,451,740 A | 9/1995 | Hanus et al. |
| 5,591,356 A | 1/1997 | Sakuragi et al. |
| 5,624,586 A | 4/1997 | Sobr et al. |
| 5,628,924 A | 5/1997 | Yoshimitsu et al. |
| 5,667,193 A | 9/1997 | Chrzanowski |
| 5,683,599 A | 11/1997 | Ellis |
| 5,718,863 A | 2/1998 | McHugh et al. |
| 5,726,415 A | 3/1998 | Luo et al. |
| 5,767,472 A | 6/1998 | Walters |
| 5,767,478 A | 6/1998 | Walters |
| 5,856,647 A | 1/1999 | Luo |
| 5,965,040 A | 10/1999 | Luo et al. |
| 5,994,663 A * | 11/1999 | Lu .............. H05H 1/34 219/121.48 |
| 6,078,023 A | 6/2000 | Jones et al. |
| 6,096,993 A | 8/2000 | Marhic et al. |
| 6,114,649 A | 9/2000 | Delcea |
| 6,130,399 A | 10/2000 | Lu et al. |
| 6,156,995 A | 12/2000 | Severance, Jr. |
| 6,163,008 A | 12/2000 | Roberts et al. |
| 6,171,099 B1 | 1/2001 | Lin |
| 6,191,381 B1 | 2/2001 | Kabir |
| 6,207,923 B1 | 3/2001 | Lindsay |
| 6,268,583 B1 | 7/2001 | Yamaguchi et al. |
| 6,350,960 B1 | 2/2002 | Norris |
| 6,365,867 B1 | 4/2002 | Hooper |
| 6,403,915 B1 | 6/2002 | Cook et al. |
| 6,452,130 B1 | 9/2002 | Qian et al. |
| 6,486,430 B2 | 11/2002 | Naor |
| 6,492,037 B2 | 12/2002 | Shindo et al. |
| 6,677,550 B2 | 1/2004 | Förnsel et al. |
| 6,677,551 B2 | 1/2004 | Hardwick |
| 6,683,273 B2 | 1/2004 | Conway et al. |
| 6,689,983 B2 | 2/2004 | Horner-Richardson et al. |
| 6,700,091 B2 | 3/2004 | Jones et al. |
| 6,713,711 B2 | 3/2004 | Conway et al. |
| 6,841,754 B2 | 1/2005 | Cook et al. |
| 6,903,301 B2 | 6/2005 | Jones et al. |
| 6,987,238 B2 | 1/2006 | Horner-Richardson et al. |
| 7,244,909 B2 | 7/2007 | Kensrue et al. |
| 7,429,715 B2 | 9/2008 | MacKenzie et al. |
| 7,598,473 B2 | 10/2009 | Cook et al. |
| 7,820,935 B2 | 10/2010 | Tverskoi et al. |
| 7,829,816 B2 | 11/2010 | Duan et al. |
| 8,395,076 B2 | 3/2013 | Matus |
| 8,552,341 B2 | 10/2013 | Zamuner |
| 8,624,150 B2 | 1/2014 | Simek et al. |
| 8,772,673 B2 | 7/2014 | Kachline |
| 2002/0125224 A1 | 9/2002 | Cook et al. |
| 2003/0052095 A1 | 3/2003 | Sanders et al. |
| 2003/0091383 A1 | 5/2003 | Conway |
| 2003/0160032 A1 | 8/2003 | Mackenzie et al. |
| 2005/0061784 A1 | 3/2005 | Matus |
| 2005/0109736 A1 * | 5/2005 | Matus ............ B23K 10/00 219/121.5 |
| 2006/0049150 A1 | 3/2006 | Severance, Jr. |
| 2006/0289396 A1 | 12/2006 | Duan |
| 2006/0289398 A1 | 12/2006 | Cook et al. |
| 2007/0082532 A1 | 4/2007 | Morris |
| 2007/0090168 A1 | 4/2007 | Snow et al. |
| 2007/0262060 A1 | 11/2007 | Roberts et al. |

(56) References Cited

U.S. PATENT DOCUMENTS

| | | |
|---|---|---|
| 2008/0173622 A1* | 7/2008 | Lindsay .................. H05H 1/34 |
| | | 219/121.52 |
| 2008/0210669 A1 | 9/2008 | Yang et al. |
| 2008/0217305 A1 | 9/2008 | Sanders |
| 2009/0039059 A1 | 2/2009 | Twarog et al. |
| 2010/0078408 A1 | 4/2010 | Liebold et al. |
| 2010/0237050 A1 | 9/2010 | Zehavi |
| 2010/0294744 A1 | 11/2010 | Hewett et al. |
| 2011/0042357 A1 | 2/2011 | Griffin |
| 2012/0031881 A1* | 2/2012 | Griffin .................. B23K 10/00 |
| | | 219/121.5 |
| 2012/0055906 A1 | 3/2012 | Shipulski et al. |
| 2012/0145680 A1* | 6/2012 | Warren, Jr. ............ B23K 10/00 |
| | | 219/121.44 |
| 2012/0292296 A1 | 11/2012 | Griffin |

FOREIGN PATENT DOCUMENTS

| | | |
|---|---|---|
| CN | 1662339 A | 8/2005 |
| CN | 101554099 A | 10/2009 |
| CN | 101884253 A | 11/2010 |
| CN | 102577630 A | 7/2012 |
| DE | 3714995 | 11/1988 |
| EP | 00/79019 | 5/1983 |
| EP | 0157702 | 10/1985 |
| EP | 0159256 | 10/1985 |
| EP | 0208134 | 6/1986 |
| EP | 0437915 | 7/1991 |
| EP | 0529850 | 3/1993 |
| EP | 1147692 | 10/2001 |
| EP | 1202614 | 5/2002 |
| EP | 2255916 | 12/2010 |
| FR | 2044232 | 2/1971 |
| GB | 1008687 | 11/1965 |
| GB | 2365810 | 2/2002 |
| JP | 01-212674 | 8/1989 |
| JP | 01-232475 | 9/1989 |
| WO | 00/02697 | 1/2000 |
| WO | 00/39485 | 7/2000 |
| WO | 01/66298 | 9/2001 |
| WO | 0176328 A2 | 10/2001 |
| WO | 03024655 | 3/2003 |
| WO | 03/089183 | 10/2003 |
| WO | 2008/033905 | 3/2008 |
| WO | 2015172140 A1 | 11/2015 |

OTHER PUBLICATIONS

Lincoln® Procut 20, 55, 80 Consumables, http://www.attcusa.com/plasma/LincolnProcut20-55-80.php.

Hypertherm MAX 40cs/42/43 Brochure, PAC120/121TS/125T Consumables, Aug. 11, 2006, http://www.hypertherm.com/languages/english/PDF/TB_MAX40cs,42,43_oldrev.pdf.

Hypertherm HD-1070 HyDefinition® Torch Parts, May 1995, 4 pages.

ESAB Welding and Cutting Products Catalog, Apr. 1995, 17 Pages.

Loc-Line image retrieved from the Internet via http://www.loc-line.com/_doc/Loc-Line%20Catalog%202012.pdf, 2015, 1 page.

Loc-line catalog retrieved from the Internet via http://www.bing.com/images/search?q=locline&FORM=HDRSC2#view=detail&id=A9C1E7002591DE5B4B70CC3D94CA70E25EEFC31C&selectedIndex=25, 2015, 24.

Hypertherm Image of Hardware Parts—Press on shield PN 120934.

\* cited by examiner

HIGH ACCESS CONSUMABLES FOR A PLASMA ARC CUTTING SYSTEM

CROSS-REFERENCE TO RELATED APPLICATIONS

This application claims the benefit of and priority to U.S. Provisional Patent Application No. 62/063,703, filed Oct. 14, 2014. This application is a continuation-in-part of U.S. Ser. No. 14/513,878, filed Oct. 14, 2014, which is a continuation-in-part of U.S. Ser. No. 13/570,526, filed Aug. 9, 2012, which is a continuation-in-part of U.S. Ser. No. 13/553,273, filed Jul. 19, 2012. This application is also a continuation-in-part of U.S. Ser. No. 13/229,105 (the '105 application), filed Sep. 9, 2011, which is a continuation-in-part of U.S. patent application Ser. No. 12/878,512, filed Sep. 9, 2010, now U.S. Pat. No. 8,624,150. The '105 application is also a continuation-in-part of U.S. patent application Ser. No. 13/169,534, filed Jun. 27, 2011, now U.S. Pat. No. 8,153,927, which is a continuation of U.S. patent application Ser. No. 11/611,625, filed Dec. 15, 2006, now U.S. Pat. No. 7,989,727, which claims benefit of and priority to U.S. Provisional Patent Application No. 60/825,453, filed Sep. 13, 2006. The '105 application is a continuation-in-part of U.S. patent application Ser. No. 12/032,630, filed Feb. 15, 2008, now U.S. Pat. No. 8,089,025, which claims benefit of and priority to U.S. Provisional Patent Application No. 60/901,804, filed Feb. 16, 2007. This application further claims benefit of and priority to U.S. Ser. No. 61/991,114, filed May 9, 2014. The contents of all of these applications are owned by the assignee of the instant application and are incorporated herein by reference in their entirety.

TECHNICAL FIELD

The present invention generally relates to consumables for a plasma arc torch, and more particularly, to a composite nozzle for a plasma arc torch having multiple integrated components.

BACKGROUND

Thermal processing torches, such as plasma arc torches, are widely used for the high temperature processing (e.g., heating, cutting, gouging and marking) of materials. A plasma arc torch generally includes a torch body, an electrode mounted within the torch body, an emissive insert disposed within a bore of the electrode, a nozzle with a central exit orifice mounted within the torch body, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

In the process of plasma arc cutting or marking a metallic workpiece, a pilot arc is first generated between the electrode (cathode) and the nozzle (anode) within a torch. When operating in this pilot arc mode, the electrode can separate from the nozzle, forming an arc between the electrode and nozzle, e.g., as described in U.S. Pat. No. 4,791,268, the contents of which are incorporated herein by reference. The gas passing between the nozzle and the electrode is ionized to form a plasma, which then exits an exit orifice of the nozzle. The gas can be passed through a swirl ring to impart a tangential motion to the gas as it passes through the torch, thereby improving torch performance. When the torch is moved near a workpiece, the arc contacts the workpiece and the current return path then transfers from the nozzle to the workpiece. Generally, the torch is operated in this transferred plasma arc mode, which is characterized by the flow of ionized plasma gas from the electrode to the workpiece, with the current return path being from the workpiece back to the power supply. The plasma thus generated can be used to cut, weld, or mark workpieces.

In addition to the blowback operation described above, alternative known techniques include blow forward technologies, in which the nozzle separates from a stationary nozzle. See, e.g., U.S. Pat. No. 5,994,663, the contents of which are incorporated herein by reference.

Dimensions of the torch are determine by the size and configuration of the consumables discussed above, e.g., the electrode, swirl ring, nozzle, and shield. Design of these consumables is highly technical and has a dramatic impact on torch life and performance. The electrode is generally surrounded by a swirl ring, a nozzle, and in some configurations a shield. All of these components, and the manner in which they are designed and combined, affect the overall torch dimensions, configuration, weight, cost and other parameters.

In addition, the torch consumables (e.g., the electrode, nozzle, swirl ring and shield) are exposed to high temperatures. Standard torches cannot run at a high percentage duty cycle without melting the torch components and causing other temperature-related problems in the torch. The torch consumables can be cooled utilizing various techniques, such as water injection cooling to cool the nozzle and/or shield, liquid cooling in the electrode and/or about nozzle, or vent holes to cool the shield as described in U.S. Pat. No. 5,132,512, the contents of which are incorporated herein in their entirety. The cooling of plasma arc torch consumables can become even harder when the plasma arc torch is run at high currents (e.g., greater than about 15 Amps) and/or when the plasma arc torch is entirely gas cooled.

Furthermore, existing plasma cutting systems include a large array of consumables available for use with different cutting currents and/or operating modes. The large number of consumable options can confuse users and increase the possibility of using incorrect consumables. The large number of consumable options can also cause lengthy torch setup time and make it difficult to transition between cutting processes that require different arrangements of consumables.

SUMMARY

A cartridge-type, composite nozzle is provided for a plasma arc cutting system that includes a nozzle body, a swirl sleeve, an insulator, a nozzle tip and a nozzle shield. The composite nozzle can combine and/or eliminate other torch components employed in existing plasma torch consumables. For example, the need for a conventional swirl ring can be eliminated as the composite nozzle can impart a swirl to a gas flow within the torch body.

The composite nozzle can have enhanced cooling capabilities, reduced manufacturing and material costs, and/or improved recyclability, durability and performance. The composite nozzle can be operable in handheld plasma cutting systems and mechanized plasma cutting systems. The composite nozzle provides multiple consumable components in one structure, thus enabling a significantly reduced assembly time (e.g. by a factor of 5-10). The integrated design also ensures that mating parts are chosen and oriented (e.g., aligned) correctly for a given cutting task and enables easier identification of a suite of appropriate consumable components for a given cutting task.

The invention, in one aspect, features a nozzle for a plasma arc cutting torch. The nozzle includes a substantially hollow, elongated body capable of receiving an electrode. The nozzle body defines a longitudinal axis and has a length (L) along the axis from a first end of the nozzle body to a second end of the nozzle body. The nozzle also includes a plasma exit orifice disposed at the first end of the body. The first end of the nozzle body has a width (W) and a ratio of the length of the nozzle body to the width of the nozzle body (L/W) is greater than about 3.

The invention in another aspect includes a method of cutting a workpiece. A plasma arc torch having a body which includes a flow path for directing a plasma gas through a swirl ring to a plasma chamber in which a plasma arc is formed is provided. A nozzle mounted relative to an electrode at a distal end of the torch body to define the plasma chamber is also provided. The nozzle includes a substantially hollow, elongated body capable of receiving the electrode. The nozzle body defines a longitudinal axis and has a length along the axis from a first end of the nozzle body to a second end of the nozzle body. The nozzle also includes a plasma exit orifice disposed at the first end of the nozzle body. The first end of the nozzle body has a width and a ratio of the length of the nozzle body to the width of the nozzle body is greater than about 3. The nozzle also includes at least one supplemental orifice disposed through at least one of an end face or a side wall of the nozzle. The at least one supplemental orifice is relative to the plasma exit orifice. The plasma arc cutting torch is operated at an amperage level of greater than about 15 Amps. Substantially all of a cooling gas is flowed through the at least one supplemental orifice at the distal end of the torch body.

The invention, in another aspect, features a nozzle assembly for a plasma arc cutting torch. The nozzle assembly includes a substantially hollow, elongated body defining a longitudinal axis and has a length along the axis from a first end of the body to a second end of the body. The nozzle assembly also includes a plasma exit orifice disposed at the first end of the body. A structure is configured to translatably receive an electrode and is integrally formed with the nozzle body. The structure includes a body with canted gas ports to provide a swirling plasma gas during operation of the plasma arc cutting torch.

The invention, in another aspect, features a method of cutting a workpiece. A nozzle assembly mounted relative to an electrode at a distal end of a torch body to define a plasma chamber is provided. The nozzle assembly includes a substantially hollow, elongated body defining a longitudinal axis and has a length along the axis from a first end of the body to a second end of the body. The nozzle assembly also includes a plasma exit orifice disposed at the first end of the nozzle body. The nozzle assembly also includes at least one supplemental orifice disposed through an end face of the nozzle assembly relative to the plasma exit orifice. A structure is configured to translatably receive an electrode and is integrally formed with the nozzle body. The structure includes a body with canted gas ports to provide a swirling plasma gas during operation of the plasma arc cutting torch. The plasma arc cutting torch is operated at an amperage level of at least about 15 Amps. Substantially all of a cooling gas is flowed through the at least one gas outlet.

The invention, in another aspect, features an electrode for a high visibility plasma arc cutting torch. The electrode includes an elongated electrode body having a first end and a second end. The electrode body defines a bore in the first end for receiving an insert and includes (i) a first body portion extending from the first end; (ii) a second body portion extending to the second end; and (iii) a heat transfer zone located relative to the first body portion at the first end of the electrode body. During operation of the plasma torch at a current greater than about 15 Amps, the heat transfer zone is in thermal communication with a cooling gas and is configured such that a majority heat generated during the operation of the plasma torch is removed from the heat transfer zone.

The invention, in another aspect, features an electrode for a high visibility plasma arc cutting torch. The electrode includes an elongated electrode body having a first end and a second end. The body defines a bore in the first end for receiving an insert. The electrode body includes (i) a first body portion extending from the first end; (ii) a second body portion extending to the second end; and (iii) a heat transfer zone located relative to the first body portion at the first end of the electrode body. The heat transfer zone is greater than about 1 square inch.

The invention, in another aspect, features a torch tip for a hand held plasma torch. The handheld plasma torch has a trigger and a torch tip mount. The torch tip includes a substantially hollow nozzle and an electrode disposed relative to the nozzle. A housing is disposed relative to the nozzle and the electrode. The nozzle, electrode and housing form an assembled torch tip having a distal end and a proximal end. The proximal end of the assembled torch tip is configured to couple to the torch tip mount. A distance from the distal end to the proximal end of the assembled torch tip is greater than about 3 inches.

The invention, in another aspect, features a torch tip for a handheld plasma torch. The handheld plasma torch has a trigger and a torch tip mount. The torch tip includes a substantially hollow nozzle and an electrode disposed relative to the nozzle. A housing is disposed relative to the nozzle and the electrode. The nozzle, electrode and housing form an assembled torch tip having a distal end and a proximal end. The proximal end of the assembled torch tip is configured to couple to the torch tip mount. The assembled torch tip defines a longitudinal axis and has a length along the axis from the proximal end to the distal end. A ratio of the length of the assembled torch tip to a width of the assembled torch tip is greater than about 3.

The invention, in another aspect, features a method of aligning an electrode in a plasma arc torch. A nozzle assembly is provided. The nozzle assembly includes a substantially hollow, elongated body capable of receiving an electrode. The body defines a longitudinal axis and has a length along the axis from a first end of the body to a second end of the body. The nozzle assembly also includes a plasma exit orifice disposed at the first end of the body. A structure is integrally formed with the nozzle body. The structure includes a body with canted gas ports to provide a swirling plasma gas during operation of the plasma arc cutting torch. An elongated electrode is disposed within the body of the nozzle. The electrode has a first end and a second end. The electrode body defines a bore in the first end of the electrode for receiving an insert. The bore of the electrode is aligned with the plasma exit orifice of the nozzle via the structure.

The invention, in another aspect, features a method for extending the life of a plasma arc torch. A torch body is provided which includes a plasma gas flow path for directing a plasma gas through a swirl ring to a plasma chamber in which a plasma arc is formed. A nozzle is provided, which is mounted relative to an electrode at a distal end of the torch body to define the plasma chamber. The nozzle includes a substantially hollow, elongated body capable of receiving the electrode. The nozzle body has a first end and a second end. The nozzle body also includes a plasma exit orifice disposed at the first end of the nozzle body, wherein the length of the nozzle body from the first end to the second end is greater than about 2 inches. At least one supplemental orifice is disposed through at least one of an end face or a side wall of the nozzle. The at least one supplemental orifice is relative to the plasma exit orifice. The plasma arc torch is operated at an amperage level of at least about 15 Amps. Substantially all cooling gas is flowed through the at least one gas outlet.

The invention, in another aspect, features, a method for extending the life of a plasma arc torch. A torch body is provided which includes a plasma gas flow path for directing a plasma gas through a swirl ring to a plasma chamber in which a plasma arc is formed. A nozzle is also provided, which is mounted relative to an electrode at a distal end of the torch body to define the plasma chamber. The nozzle includes a substantially hollow, elongated body capable of receiving the electrode. The nozzle body defines a longitudinal axis and has a length along the axis from a first end of the nozzle body to a second end of the nozzle body. A plasma exit orifice is disposed at the first end of the nozzle body. The length of the nozzle body from the first end to the second end is greater than about 2 inches. The plasma arc torch is operated at an amperage level of at least about 15 Amps. Substantially all the cooling gas is flowed out the distal end of the torch body.

In some embodiments, the nozzle also includes an end face at the first end of the body through which the plasma exit orifice is disposed and at least one supplemental orifice disposed through the end face relative to the plasma exit orifice. The at least one supplemental orifice can be canted or the at least one supplemental orifice can be linear/straight. Substantially all cooling gas can exit through the at least one supplemental orifice.

The nozzle can also include at least one orifice disposed through the body of the nozzle. The at least one orifice can be canted or the at least one orifice can be linear/straight. In some embodiments, the plasma arc torch is gas cooled. Substantially all cooling gas exits through the at least one orifice.

In some embodiments the nozzle body includes at least one supplemental orifice disposed through the end face of the nozzle. The nozzle body can include at least one orifice disposed through the body of the nozzle. In some embodiment, the nozzle body includes at least one supplemental orifice disposed through the end face of the nozzle and at least one orifice disposed through the body of the nozzle.

The nozzle can also include at least one heat exchanging element disposed on the nozzle body and in thermal communication with a cooling gas. The at least one heat exchanging element can be disposed on an outer surface of the nozzle body. The at least one heat exchanging element can be disposed on an inner surface of the nozzle body.

The length of the nozzle can be greater than about 2, 3, 4, 5, 6, 7, 8, 9, 10, 11, 12, 13, 14, 15, 16, 17, 18, 19, or 20 inches. In some embodiments, the length of the nozzle is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

The ratio of the length to the width of the nozzle can be greater than about 4, 5, 6, 7, 8, 9, 10, 11, 12, 13, 14, 15, 16, 17, 18, 19, or 20. In some embodiments, the ratio of the length to the width of the nozzle is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5.

In some embodiments, any of the nozzles described herein are used in a plasma arc cutting torch. The plasma arc cutting torch can be a hand held plasma arc cutting torch.

The length of the nozzle assembly can be greater than about 2, 3, 4, 5, 6, 7, 8, 9, 10, 11, 12, 13, 14, 15, 16, 17, 18, 19, or 20 inches. In some embodiments, the length of the nozzle assembly is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

In some embodiments, the nozzle assembly also includes an end face at the first end of the body through which the plasma exit orifice is disposed and at least one supplemental orifice disposed through at least one of the end face or a side wall relative to the plasma exit orifice. The at least one supplemental orifice can be canted. Substantially all cooling gas can exit through the at least one supplemental orifice. The structure within the nozzle assembly can be capable of translatably receiving the electrode.

The nozzle assembly can also include at least one heat exchanging element disposed on the nozzle body and in thermal communication with a cooling gas. The at least one heat exchanging element can be disposed on an outer surface of the nozzle body. The at least one heat exchanging element can be disposed on an inner surface of the nozzle body.

The nozzle assembly can also include at least one orifice disposed through the nozzle body. In some embodiments the nozzle body includes at least one supplemental orifice disposed through the end face of the nozzle. The nozzle body can include at least one orifice disposed through the body of the nozzle. In some embodiment, the nozzle body includes at least one supplemental orifice disposed through the end face of the nozzle and at least one orifice disposed through the body of the nozzle.

In some embodiments, any of the nozzle assemblies described herein are used in a plasma arc cutting torch. The plasma arc cutting torch can be a hand held plasma arc cutting torch.

The heat transfer zone of the electrode can be greater than about 1 square inch. The heat transfer zone can be between about 1 square inch and about 3 square inches.

In some embodiments, any of the electrodes described herein are used in a plasma arc cutting torch. The plasma arc cutting torch can be a hand held plasma arc cutting torch.

In some embodiments, the nozzle and/or electrode are elongated. The nozzle can have a length along a longitudinal axis extending from a first end of the nozzle and a second end of the nozzle. The length from the first end to the second end of the nozzle can be greater than about 2, 3, 4, 5, 6, 7, 8, 9, 10, 11, 12, 13, 14, 15, 16, 17, 18, 19, or 20 inches. In some embodiments, the length of the nozzle is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

The housing can include an adapter capable of extending the distance from the distal end to the proximal end of the assembled torch tip. The distance from the distal end to the proximal end of the assembled torch tip can be greater than about 5, 6, 7, 8, 9, 10, 11, 12, 13, 14, 15, 16, 17, 18, 19, or 20 inches. In some embodiments, the distance from the distal end to the proximal end of the assembled torch tip can be greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches.

In some embodiments, the torch tip also includes at least one heat exchanging element disposed on the nozzle and in thermal communication with a cooling gas. The at least one heat exchanging element can be disposed on an outer surface of the nozzle. The at least one heat exchanging element can be disposed on an inner surface of the nozzle.

The invention, in another aspect, features a nozzle for a plasma arc torch. The nozzle includes a substantially hollow, elongated nozzle body capable of receiving an electrode. The body defines a longitudinal axis, a distal end, and a proximal end. The nozzle additionally includes a swirl sleeve attachable to an interior surface of the nozzle body. The swirl sleeve is configured to impart a swirling motion to a gas introduced to the nozzle. The nozzle also includes a nozzle tip connected to the proximal end of the nozzle body. The nozzle tip includes a nozzle exit orifice for introducing a plasma arc to a workpiece. The nozzle further includes a nozzle shield and an insulator configured to connect the nozzle tip and the nozzle shield to electrically insulate the nozzle shield and the nozzle tip from one another while transferring thermal energy therebetween.

In some embodiments, the nozzle body, the swirl sleeve, the nozzle tip, the nozzle shield and the insulator are connected via press fit. In some embodiments, the nozzle comprises a single consumable component of the plasma arc torch. In some embodiments, at least one of the nozzle body, the swirl sleeve, the nozzle tip or the nozzle shield comprises a conductive material.

In some embodiments, the nozzle body comprises aluminum. The nozzle body can have a length along the longitudinal axis of about 2.5 to about 3 inches and a cross-sectional width of about 0.4 to about 0.5 inches.

In some embodiments, the swirl sleeve is slideably attached to the interior surface of the nozzle body from the proximal end. The swirl sleeve can form an interference fit with the nozzle body at a step region disposed on the interior surface of the nozzle body. The swirl sleeve can comprise copper. The swirl sleeve can have a length of about 0.11 to about 0.12 inches along the longitudinal axis.

In some embodiments, the nozzle tip comprises copper. The nozzle tip can be about ½, ⅓ or ¼ the length of the nozzle body along the longitudinal axis. The nozzle tip can be about 20%, 30% or 40% the length of the nozzle along the longitudinal axis. The nozzle tip can have a length of about 0.9 to about 1 inch along the longitudinal axis and a cross-sectional width of about 0.37 to about 0.4 inches.

In some embodiments, the insulator comprises at least one of anodized aluminum or plastic. The insulator can have a length of about 0.3 to about 0.4 inches along the longitudinal axis and a largest cross-sectional width of about 0.4 to about 0.5 inches.

In some embodiments, the nozzle shield comprises copper. The nozzle shield can have a length of about 0.25 to about 0.35 inches along the longitudinal axis and a largest cross-sectional width of about 0.4 to about 0.5 inches.

According to another aspect, a plasma arc torch assembly is provided that includes an electrode, a composite nozzle, and a retaining cap. The composite nozzle is configured to substantially surround the electrode. The composite nozzle comprises a nozzle body, a swirl sleeve, a nozzle tip, a nozzle shield and an insulator interconnected by press fit. The retaining cap is configured to substantially surround the composite nozzle to maintain the composite nozzle in the plasma arc torch assembly.

In some embodiments, the swirl sleeve comprises at least one swirl hole configured to introduce swirl to a gas in the plasma arc torch assembly.

In some embodiments, the nozzle tip includes a vent hole fluidly connecting the interior of the nozzle to the ambient via the retaining cap. The vent hole is configured to direct a first gas flow from the interior of the nozzle to the ambient to perform at least one of cool the nozzle, cool the nozzle shield, provide stability to a plasma arc, or remove dross. The nozzle tip can also include a vent channel fluidly connecting the interior of the nozzle to the nozzle shield. The vent channel is configured to direct a second gas flow from the interior of the nozzle to the nozzle shield as shield gas. In some embodiments, at least one of the first gas flow or the second gas flow slows the swirling motion of the gas in the nozzle tip.

In some embodiments, the plasma arc torch assembly can further comprise a swirl ring coupled to a distal end of the electrode to substantially surround an exterior surface of the electrode.

In some embodiments, the retaining cap defines a longitudinal axis and having a length along the longitudinal axis from a distal end of the retaining cap to a proximal end, the length being about 4.5 to about 5.5 inches, a first width of the distal end being about 1 inch, and a second width of the proximal end being about 0.5 inches. The first width can define the widest cross-sectional width of the distal end and a ratio of the length to the first width can be greater than 3 or 4. The second width can define the cross-sectional width of the proximal end and a ratio of the length to the second width can be greater than 5, 6, 7, 8 or 9.

According to another aspect, a method for forming a plasma arc torch assembly is provided. The method includes attaching a swirl ring to an electrode to form a first portion, where the swirl ring substantially surrounds an exterior surface of the electrode. The method also includes inserting the first portion into a composite nozzle to form a second portion. The composite nozzle comprises a nozzle body, a swirl sleeve, a nozzle tip, a nozzle shield and an insulator interconnected by press fit. The method further includes inserting the second portion into a retaining cap to form the plasma arc torch assembly. The retaining cap is configured to substantially surround the second portion for maintaining the second portion in the plasma arc torch assembly.

In some embodiments, the method further comprises sliding the swirl sleeve into the nozzle body from a proximal end of the nozzle body to form an interference fit between the swirl sleeve and a step region of an interior surface of the nozzle body.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
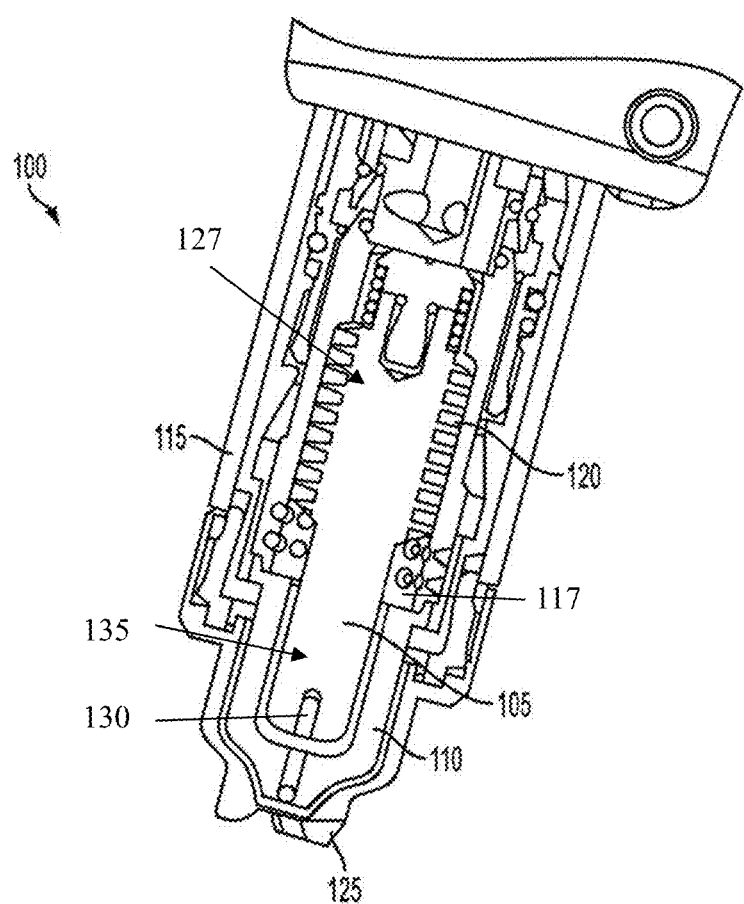
FIG. 1 is a cross-sectional view of a plasma arc torch tip.

FIG. 1 shows a cross-sectional view of a plasma arc torch 100. A plasma torch tip is comprised of a variety of different consumables, for example, an electrode 105, a nozzle 110, a retaining cap 115, a swirl ring 117, or a shield 125. The nozzle 110 has a central exit orifice mounted within a torch body. The torch and torch tip can include electrical connections, passages for cooling, and passages for arc control fluids (e.g., plasma gas). The shield 125 can be used to prevent molten spatter from damaging the other components of the torch, for example, the electrode 105, nozzle 110, retaining cap 115, or swirl ring 120. The electrode 105 can include a heat exchanger 120 at a proximal end 127 of the electrode 105.

A plasma arc torch that is capable of reaching into hard to access areas (e.g., channels or corners) can have consumables that are elongated to provide the added reach required to access these types of locations. These longer length consumables (e.g., "pointy" consumables) can also increase the visibility of an operator using the plasma arc torch. This increased visibility allows an operator to see a cut that is being made because the torch handle is further away from the cut, which creates clearance for the operator to view the cut.

However, having longer consumables can result in insufficient cooling of the plasma arc torch and the overheating and melting of the consumable parts. The over heating can be due, at least in part, to the fact that prior cooling techniques utilized a heat exchanger on the back end of the electrode, away from the insert. When the consumables are extended, this heat exchanger is moved further away from the heat source (e.g., the insert of the electrode). The further away the cooling mechanism is from the heat source, the more inefficient the cooling becomes. As a result, the extended consumables overheat and melt prematurely. This overheating is particularly pronounced when the plasma arc torch is being operated at currents above about 15 Amps, or more particularly, operated at currents above about 60 Amps. The overheating is also particularly pronounced when the plasma arc torch is entirely gas cooled (e.g., cooled by air).

Figure 2:
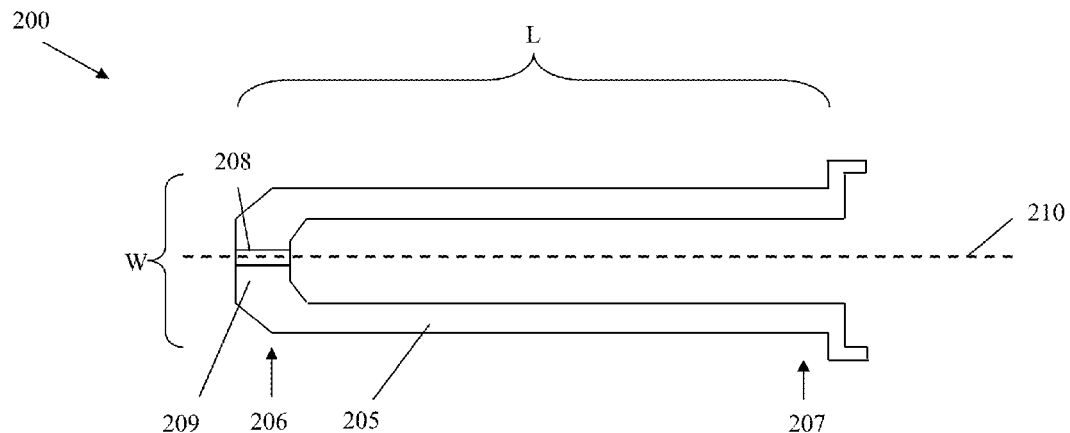
FIG. 2 is a cross-sectional view of a nozzle, according to an illustrative embodiment of the invention.

In some embodiments, the consumables (e.g., nozzle, electrode, retaining cap, shield, and/or swirl ring) are longer than about 2 inches. FIG. 2 shows a cross-sectional view of a nozzle 200. The nozzle 200 includes a body 205 that is substantially hollow with a first end 206 and a second end 207. The hollow nozzle body 205 is capable of receiving an electrode (e.g., the electrode 105 of FIG. 1). A plasma exit orifice 208 is disposed through an end face 209 at the first end 206 of the body 205.

The nozzle body 205 defines a longitudinal axis 210. The nozzle body 205 has a length L along the longitudinal axis 210 from the first end 206 to the second end 207 of the nozzle body 205. The first end 206 of the nozzle body has a width W. A ratio of the length L of the nozzle body 205 to the width W of the nozzle body 205 is greater than about 3.

For example, to have a ratio of L/W of greater than about 3, the length of the nozzle body 205 can be about 3.5 inches and the width of the nozzle body can be about 0.5 inches. This provides a ratio of L/W equal to 3.5 inches/0.5 inches or a ratio of L/W of 7.

In some embodiments the length of the nozzle can be greater than about 2 inches. The length of the nozzle can be greater than about 3, 4, 5, 6, 7, 8, 9, 10, 11, 12, 13, 14, 15, 16, 17, 18, 19, or 20 inches. In some embodiments, the length of the nozzle is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches. Although specific numbers are listed herein for the length and/or width of the nozzle, those of ordinary skill in the art would readily recognize that other lengths and widths can be used without departing from the scope of the invention. For example, the nozzle can have a length greater than about 21 inches without departing from the scope of the invention.

The ratio of the length to the width of the nozzle can be greater than about 4, 5, 6, 7, 8, 9, 10, 11, 12, 13, 14, 15, 16, 17, 18, 19, or 20. In some embodiments, the ratio of the length to the width of the nozzle is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5. Although specific ratios of L/W are listed herein, those of ordinary skill in the art would readily recognize that other lengths and widths can be used without departing from the scope of the invention. For example, the nozzle can have a ratio greater than about 21 inches without departing from the scope of the invention.

Figure 3:
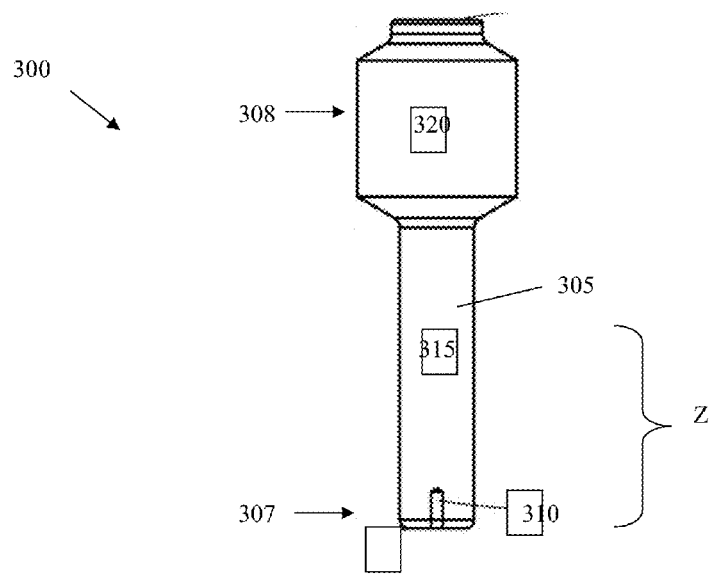
FIG. 3 is a perspective view of an electrode, according to an illustrative embodiment of the invention.

Similarly, the electrode (e.g., electrode 105 of FIG. 1) can be designed so that the plasma arc torch is capable of reaching into hard to access areas. Proper design of the electrode is a key requirement to achieving a torch stack up that has high access and high visibility features. A reliable high access and high visibility torch requires an electrode with proper ratios and tolerances. FIG. 3 shows an electrode 300 having an elongated body 305 that can achieve the high access and high visibility requirements mentioned herein. The electrode body 305 has a first end 307 and a second end 308. The electrode body 305 also defines a bore 310 in the first end 307 for receiving an insert (e.g., hafnium). The electrode has a first body portion 315 extending from the first end 307 and a second body portion 320 extending to the second end 308. The first and second body portions 315, 320, respectively, can be formed as an integral assembly, e.g., from a single piece of metal (such as copper).

Although elongating the consumables, for example, elongating the nozzle 200 of FIG. 2 and/or the electrode 300 of FIG. 3, can extend the reach, visibility and pointiness of the plasma arc torch, the life of the consumables is greatly deceased due to over heating when prior art cooling techniques are used. Prior art cooling techniques typically provide for a heat exchanger at the opposite end of the electrode as the hafnium insert. The cooling fluid performs most of its cooling function at the location of the heat exchanger. However, when the hafnium insert (e.g., the location where a substantial amount of heat is being generated), a heat exchanger located at a distance from the insert is insufficient for cooling purposes.

For example, referring to FIG. 1, elongating electrode 105 results in the hafnium insert 130 being further away from the heat exchanger 120. The heat exchanger 120, which is configured to remove heat from the electrode and other consumables when in communication with a cooling fluid, can no longer effectively remove sufficient heat from the proximal end 135 of the electrode 105, resulting in overheating and melting of the consumable parts. This overheating is particularly pronounced when the plasma arc torch is being operated at currents above about 15 Amps, or more particularly, operated at currents above about 60 Amps. The overheating is also particularly pronounced when the plasma arc torch is entirely gas cooled (e.g., cooled by air). In some embodiments, the torch is cooled by oxygen and/or nitrogen in various ratios.

To compensate for the inefficient cooling of the consumables, the consumables and cooling path can be designed so that substantially all of the cooling occurs at the front end of the torch tip near the insert of the electrode. For example, the cooling gas can flow between the electrode and nozzle, passing through a swirl ring and flowing through the plasma chamber and out the end face of the nozzle. A small portion of this gas can be carried to the nozzle orifice as a swirling cut gas. By cooling in this way, the distance from the nozzle tip to the torch can be greatly extended. This combination of long consumables with forward flow cooling provides the advantages described herein without sacrificing consumable life.

In some embodiments, substantially all of the cooling gas (e.g., a majority of the cooling gas, greater than 75% of the cooling gas, greater than about 80% of the cooling gas, greater than about 95% of the cooling gas, or about 99% of the cooling gas) exits through the front, or tip, of the plasma arc torch and almost no cooling gas is allowed to flow back into the torch (however, the pressure in the plenum chamber can still blow back this electrode to a cutting position). This new "forward flow" cooling design cools the consumables at the location where the majority of the heat of the plasma arc torch is generated (e.g., at the insert of the electrode). Therefore, the electrodes of the present invention do not require a heat exchanger at the proximal end of the electrode as shown in FIG. 1.

The electrode (e.g., electrode 300 of FIG. 3) can have a solid base with an inner hole to reduce temperature conduction within the electrode. A large temperature difference between the electrode and the cooling gas is created to drive heat into the cooling gas at the electrode tip. This drastically reduces the heat flow into the electrode body, thus extending the life of the electrode and other consumables. In addition, the plasma arc torch can operate at lower temperatures for any given gas flow and extremely high gas flows are no longer needed to adequately cool the consumables. Moreover, higher operating currents (e.g., greater than 150 Amps) can be achieved due to the drastically increased cooling of the consumables.

The forward flow cooling design also allows a workpiece to be cut without substantially heating up the torch body and handle. The heat generated by the plasma arc torch near the tip of the electrode at the insert is moved forward during cooling and is not moved backward toward the torch body and handle. This not only provides more efficient cooling, but also increases operator safety as the most likely locations an operator would touch on a plasma arc torch (e.g., the handle and torch body) are not as hot as prior art plasma arc torches. In addition, the handles of a plasma arc torch can be smaller because the handles are not required to absorb as much heat as they had to in prior art plasma arc torches. Moreover, the consumables can be made of less copper since the cooling is more efficient. For example, the back end of the electrode closest to the handle can be made of less copper than prior art electrodes since the heat generated by the plasma arc torch near the tip of the electrode at the insert is moved forward during cooling and is not moved backward toward the torch body and handle. Therefore, the consumables can be made with less copper and are less expense than prior art consumables.

In addition, the extended consumables and forward flow design of the present invention reduces the need for extremely high gas flows. With the new forward flow design, the same amount of heat can be removed from the tip of the electrode using less gas than was previously required for prior art consumable designs. This is due, in part, to the cooling gas moving in a single direction (forward, or toward the electrode insert), instead of flowing both forward and backward to cool the consumables.

Figure 4:
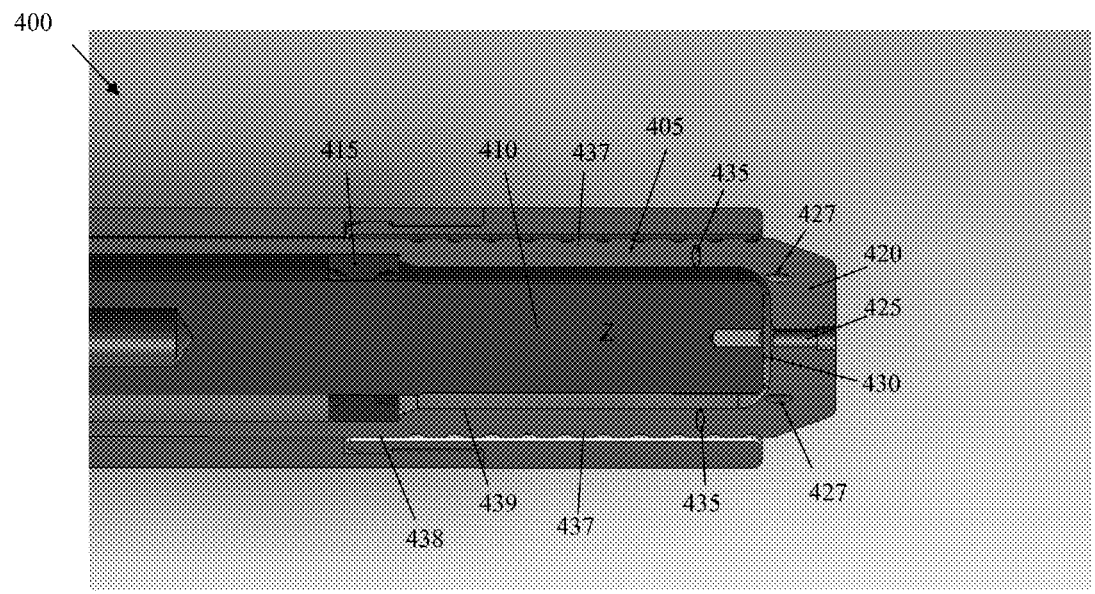
FIG. 4 is a cross-sectional view of a torch tip, including a nozzle, electrode and swirl ring, according to an illustrative embodiment of the invention.

FIG. 4 shows a torch tip 400, with elongated consumables, including a nozzle 405, electrode 410 and swirl ring 415, that can be used in a plasma arc torch operated at high currents and entirely gas cooled. The nozzle 405 has an end face 420 through which a plasma exit orifice 425 is disposed. The end face 420 can also have at least one supplemental orifice 427 disposed relative to the plasma exit orifice 425. The supplemental orifices 427 can be located beyond an end face 430 of the electrode 410.

Figure 5:
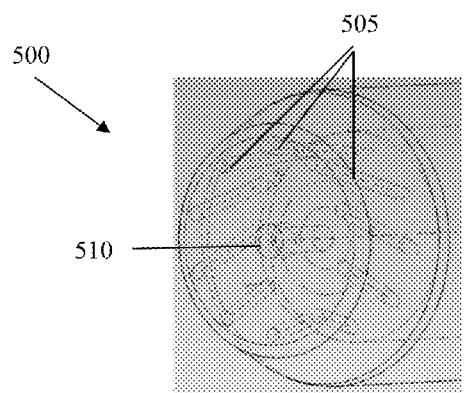
FIG. 5 is a perspective view of a nozzle, according to an illustrative embodiment of the invention.

The supplemental orifice 427 can be canted or it can be straight or linear. Canted supplemental orifices can provide a swirling component to the cooling gas exiting the nozzle to direct the cooling gas away from the cut zone. FIG. 5 shows a nozzle 500 with canted or angled supplemental orifices 505. As shown in FIG. 5, the supplemental orifices 505 are disposed relative to the plasma exit orifice 510. The plasma arc exits the plasma arc torch through the plasma exit orifice 510 when the torch is in operation. The cooling gas can exit through the supplemental orifices 505 to provide cooling at the tip of a consumable set. In some embodiments, substantially all the cooling gas (e.g., greater than about 95% of the cooling gas) exits through the supplemental orifices 505.

Referring back to FIG. 4, the body of the nozzle 405 can have at least one orifice 435 disposed there through. The nozzle 405 can have either the supplemental orifices 427 or the orifices 435. In some embodiments, the nozzle 405 has both the supplemental orifices 427 and the orifices 435. The orifices 435 can be canted/angled or straight/linear.

Substantially all the cooling gas can be used to cool the consumables at the tip of the plasma arc cutting torch and substantially all the cooling gas can exit through the supplemental orifices 427 and/or the orifices 435. In this way, all of the cooling gas is flowed down the outside of the electrode and/or the outside of the nozzle, to cool the consumables at the point where the majority of the heat is generated in the plasma arc torch (e.g., at or near the insert of the electrode). This forward flow method results in a plasma arc torch being entirely gas cooled and capable of operating at currents greater than 15 Amps (or greater than 45 Amps, or greater than 60 Amps, or greater than 90 Amps, or greater than 150 Amps) without premature consumable failure.

The supplemental orifices 427 and the orifices 435 can be sized so that substantially all of the cooling gas flows through the supplemental orifices 427 and/or the orifices 435.

To further cool the consumables, heat exchanging elements 437 can be disposed on the nozzle body. The heat exchanging elements 437 can be bumps, grooves, channels, texturing, protuberances, protrusions, and/or fins. The heat exchanging elements 437 are in thermal communication with a cooling gas and provide added surface area to increase the heat transfer coefficient and heat transfer rate. In some embodiments, the heat exchanging elements 437 are disposed on an outer surface 438 of the nozzle 405, as shown in FIG. 4. In some embodiments, the heat exchanging elements 437 are disposed on an inner surface 439 of the nozzle 405. The heat exchanging elements 437 can be disposed on both the outer surface 438 and inner surface 439 of the nozzle 405.

Figure 6:
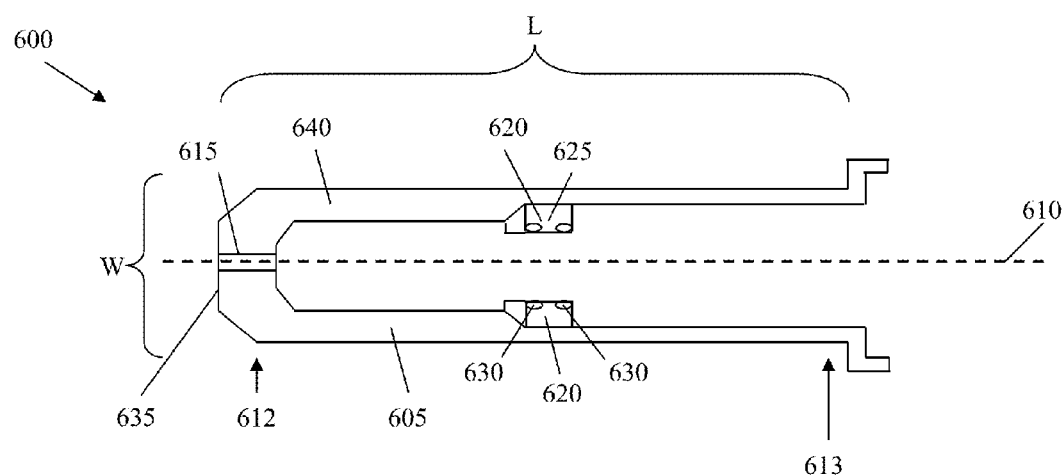
FIG. 6 is a cross-sectional view of a nozzle assembly, according to an illustrative embodiment of the invention.

In some embodiments, the nozzle can include an integrally formed structure forming a nozzle assembly 600 of FIG. 6. The nozzle assembly 600 can include a substantially hollow, elongated body 605. The elongated body 605 defines a longitudinal axis 610. The assembly body 605 has a length L only the axis from a first end 612 to a second end 613 of the body 605. The nozzle assembly 600 has a plasma exit orifice 615 disposed at the first end 612 of the body 605.

The nozzle assembly includes a structure 620 that is integrally formed with the nozzle body 605. In some embodiments, the structure 620 is removable from the nozzle body 605. The structure 620 can be, for example, a swirl ring that can control the orientation of the cooling gas flow. The structure 620 is configured to translatably receive an electrode such that blowback torch technology can be used. For example, an inner surface of the structure 620 can be a bearing surface that can allow the electrode to slide within the structure 620. The structure 620 includes a body 625 with canted gas ports 630 to provide a swirling plasma gas during operation of the plasma arc cutting torch.

The structure 620 can be embedded in the nozzle body 605, such that it is not removable. The inner diameter of the nozzle body 605 can be substantially the same as the outer diameter of the structure 620. The structure 620 can be used to align a bore of an electrode with the plasma exit orifice 615. The structure 620 can be sized such that the bore of the electrode axially aligns with the plasma exit orifice when the electrode is disposed within the hollow body of the nozzle. For example, the outer diameter of the electrode and be substantially the same as the inner diameter of the structure 620, thus aligning the electrode bore with the plasma exit orifice.

The alignment feature of the structure 620 is particularly useful when long, pointy consumables are used within a plasma arc torch. Because of the length of the consumables, the electrode can be tilted or angled with respect to a longitudinal axis 610. This tilting or angling of the electrode within the nozzle is particularly pronounced when alignment of the electrode occurs at the back or proximal end of the torch tip. When the electrode bore and plasma exit orifice of the nozzle are misaligned, double arcing or poor torch performance can occur.

To ensure proper alignment of the electrode bore and the plasma exit orifice, the structure 620 of FIG. 6 can be used to align the electrode and nozzle. As shown in FIG. 6, the alignment occurs close to the tip of the nozzle/electrode ensuring alignment of the electrode and nozzle. Moreover, aligning the electrode and nozzle at the tip of the torch aligns the electrode along the longitudinal axis 610 of the nozzle, thus decreasing or eliminating any tilting or angling of the electrode.

In addition to the aligning feature of the structure 620, the structure 620 also isolates the electrode from the nozzle. For example, the structure electrically isolates the electrode from the nozzle. The structure 620 can be for example, non-conductive (e.g., made from a non-conductive material) to electrically isolate the electrode from the nozzle.

In some embodiments the length of the nozzle assembly can be greater than about 2 inches. The length of the nozzle assembly can be greater than about 3, 4, 5, 6, 7, 8, 9, 10, 11, 12, 13, 14, 15, 16, 17, 18, 19, or 20 inches. In some embodiments, the length of the nozzle assembly is greater than about 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, or 20.5 inches. Although specific numbers are listed herein for the length and/or width of the nozzle, those of ordinary skill in the art would readily recognize that other lengths and widths can be used without departing from the scope of the invention. For example, the nozzle assembly can have a length greater than about 21 inches without departing from the scope of the invention.

The nozzle assembly can have a ratio or L/W of at least about 2. The ratio of the length to the width of the nozzle assembly can be greater than about 4, 5, 6, 7, 8, 9, 10, 11, 12, 13, 14, 15, 16, 17, 18, 19, or 20. In some embodiments, the ratio of the length to the width of the nozzle assembly is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5. Although specific ratios of L/W are listed herein, those of ordinary skill in the art would readily recognize that other lengths and widths can be used without departing from the scope of the invention. For example, the nozzle assembly can have a ratio greater than about 21 inches without departing from the scope of the invention.

Similar to the nozzle 405 of FIG. 4, the nozzle assembly 600 can have at least one supplemental orifice (not shown) disposed through at least one of an end face 635 of the nozzle assembly 600 or a side wall 640 relative to the plasma exit orifice 615. The supplemental orifice can be canted and substantially all of the cooling gas can exit through the at least one supplemental orifice (located in the end face and/or the side wall of the nozzle).

The nozzle assembly 600 can have at least one heat exchanging element (not shown) disposed on the nozzle body 605 and in thermal communication with a cooling gas. The heat exchanging elements can be disposed on an outer and/or inner surface of the nozzle body 605.

Referring to FIG. 3, the electrode 300 can include a heat transfer zone Z located relative to the first body portion 315 at the first end 307 of the electrode body 305. The heat transfer zone Z can be an area of the outer surface of the electrode 300 from which heat is transferred from the electrode to a cooling gas. The area or heat transfer zone Z can include an area of any heat exchanging elements that can be disposed on the outer surface of the electrode 300 (e.g., similar to the heat exchanging elements described with respect to the nozzle). During operating of the plasma arc torch (e.g., at a current greater than about 15 Amps), the heat transfer zone Z is in thermal communication with a cooling gas and is configured such that a majority of heat generated during the operation of the plasma torch is removed from the heat transfer zone Z. The specific amount of heat removed can depend on the specific operating parameters of the plasma arc torch. For example, a torch operated at a current of about 15 Amps will require less heat to be removed from the heat transfer zone than a torch operated at a current of about 60 Amps. This is because a torch operated at a higher current generates more heat than a torch operated at a lower current. The amount of heat removed from the heat transfer zone should be sufficient to prevent premature failure (e.g., melting) of the consumables. One of ordinary skill in the art would readily appreciate the amount of heat required to be removed from the heat transfer zone to prevent premature failure of the consumables.

The heat transfer zone Z can be greater than about 1 square inch. In some embodiments, the heat transfer zone Z can be between about 1 square inch and about 3 square inches. For example, the heat transfer zone Z can be 1.1, 1.2, 1.3, 1.4, 1.5, 1.6, 1.7, 1.8, 1.9, 2, 2.1, 2.2, 2.3, 2.4, 2.5, 2.6, 2.7, 2.8, or 2.9 square inches. Although specific numbers are listed herein for the heat transfer zone of the electrode, those of ordinary skill in the art would readily recognize that other areas can be used without departing from the scope of the invention. For example, the electrode can have a heat transfer zone greater than about 3 square inches or greater than about 3.5 inches without departing from the scope of the invention. In some embodiments, the heat transfer zone is less than about 1 square inch, e.g., the heat transfer zone can be about 0.75 or 0.5 square inches.

Figure 7:
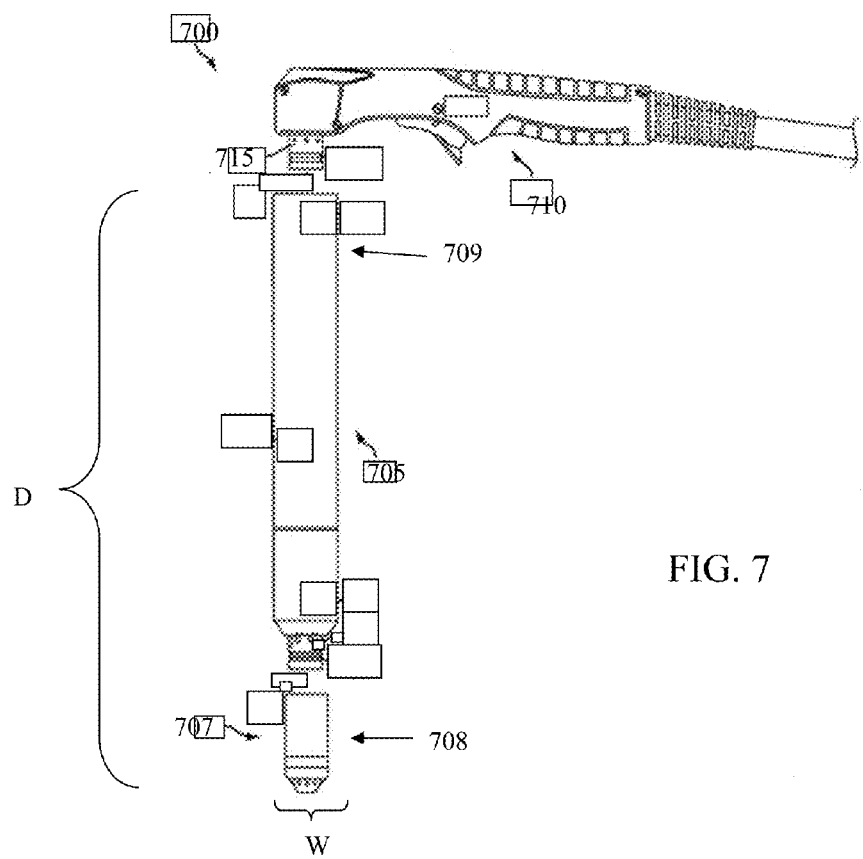
FIG. 7 is a side view of a plasma arc torch adapter for extending a plasma arc torch, according to an illustrative embodiment of the invention.

FIG. 7 shows a plasma arc torch system 700, including a housing 705 disposed relative to a consumable set 707, including a nozzle (not shown) and an electrode (not shown) of a plasma arc torch 710. The housing 705 and consumable set 707 forms an assembled torch tip having a distal end 708 and a proximal end 709. The proximal end 709 of the torch tip is configured to couple to a torch tip mount 715. For example, the proximal end 709 of the torch tip can couple to the torch tip mount 715 via threads.

The nozzle of the torch tip/consumable set 707 can be any of the nozzle embodiments described herein. The electrode of the torch tip/consumable set 707 can be any of the electrode embodiments described herein.

In some embodiments, as shown in FIG. 7, the housing 705 is an adapter or extender that can be used with prior art consumables 707 to extend the torch tip to reach into hard to access areas. For example, the housing 705 can extend the distance from the distal end 708 to the proximal end 709 of the assembled torch tip. In other embodiments, as shown in FIG. 8, elongated consumables are used and a housing 805 is used to accommodate the consumables.

Figure 8:
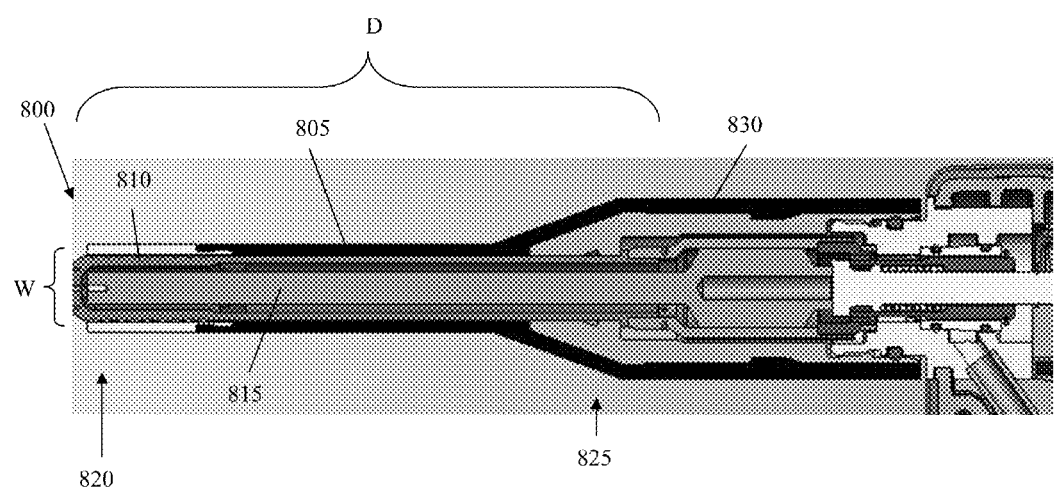
FIG. 8 is a cross-sectional view of a torch tip, according to an illustrative embodiment of the invention.

FIG. 8 shows a torch tip 800 for a hand held plasma arc torch the includes a substantially hollow nozzle 810, an electrode 815 disposed relative to the nozzle, and a housing 805 disposed relative to the nozzle 810 and the electrode 815. The nozzle 810, electrode 815, and housing 805 form an assembled torch tip having a distal end 820 and a proximal end 825. The proximal end 825 is configured to couple to a torch tip mount (not shown) of the plasma arc torch (not shown).

As shown in FIG. 8, the nozzle 810 and/or electrode 815 can be elongated. The nozzle 810 can be any nozzle embodiment described herein. The electrode 815 can be any electrode embodiment described herein. The electrode 815 can be designed such that there is no heat exchanger at the proximal end 825 of the electrode 815. The elimination of the heat exchanger at the proximal end 825 of the electrode 815 further increases the pointiness of the electrode 815.

The distance D from the distal end to the proximal end of the assembled torch tip of either of FIG. 7 or 8, can be greater than about 5, 6, 7, 8, 9, 10, 11, 12, 13, 14, 15, 16, 17, 18, 19, or 20 inches. In some embodiments, distance D from the distal end to the proximal end of the assembled torch tip of either of FIG. 7 or 8 is greater than about 4.5, 5.5, 6.5, 7.5, 8.5, 9.5, 10.5, 11.5, 12.5, 13.5, 14.5, 15.5, 16.5, 17.5, 18.5, 19.5, or 20.5 inches. Although specific numbers are listed herein for the distance from the distal end to the proximal end of the assembled torch tip, those of ordinary skill in the art would readily recognize that other lengths can be used without departing from the scope of the invention. For example, the torch tip can have a length greater than about 21 inches without departing from the scope of the invention.

In some embodiments a ratio of the length D of the assembled torch tip to a width W of the assembled torch tip of either of FIG. 7 or 8 can be greater than about 3, 4, 5, 6, 7, 8, 9, 10, 11, 12, 13, 14, 15, 16, 17, 18, 19, or 20. The ratio of the length D of the assembled torch tip to a width W of the assembled torch tip of either of FIG. 7 or 8 can be greater than about 4.5, 5.5, 6.5, 7.5, 8.5, 9.5, 10.5, 11.5, 12.5, 13.5, 14.5, 15.5, 16.5, 17.5, 18.5, 19.5, or 20.5. Although specific numbers are listed herein for the ratio, those of ordinary skill in the art would readily recognize that other ratios can be used without departing from the scope of the invention. For example, the torch tip can have a ratio greater than about 21 inches without departing from the scope of the invention.

In addition to the nozzle 810 and electrode 815 being elongated, a retaining cap 830 can also be extended to accommodate the extended nozzle 810 and electrode 815. The additional length of the retaining cap 830 can protect the consumables and/or operator. The longer consumables allow an operator to be physically farther away from the plasma arc than when prior art consumables are used resulting in greater safety for the operator. The retaining cap 830 can also allow for shield cooling flow for consumables because the inner surface of the retaining cap 830 can be used a part of the gas channel to flow gas down the shield. The retaining cap can have a plastic sheath which extends nearly the entire length of the nozzle. At the terminating end of the retaining cap (e.g., the end near the tip of the electrode and closest to the heat generation when the plasma arc torch is operated) an anodized aluminum tip can be added for heat protection. The entire outer surface of the retaining cap can then be electrically floating from the electrode and nozzle.

Figure 9:
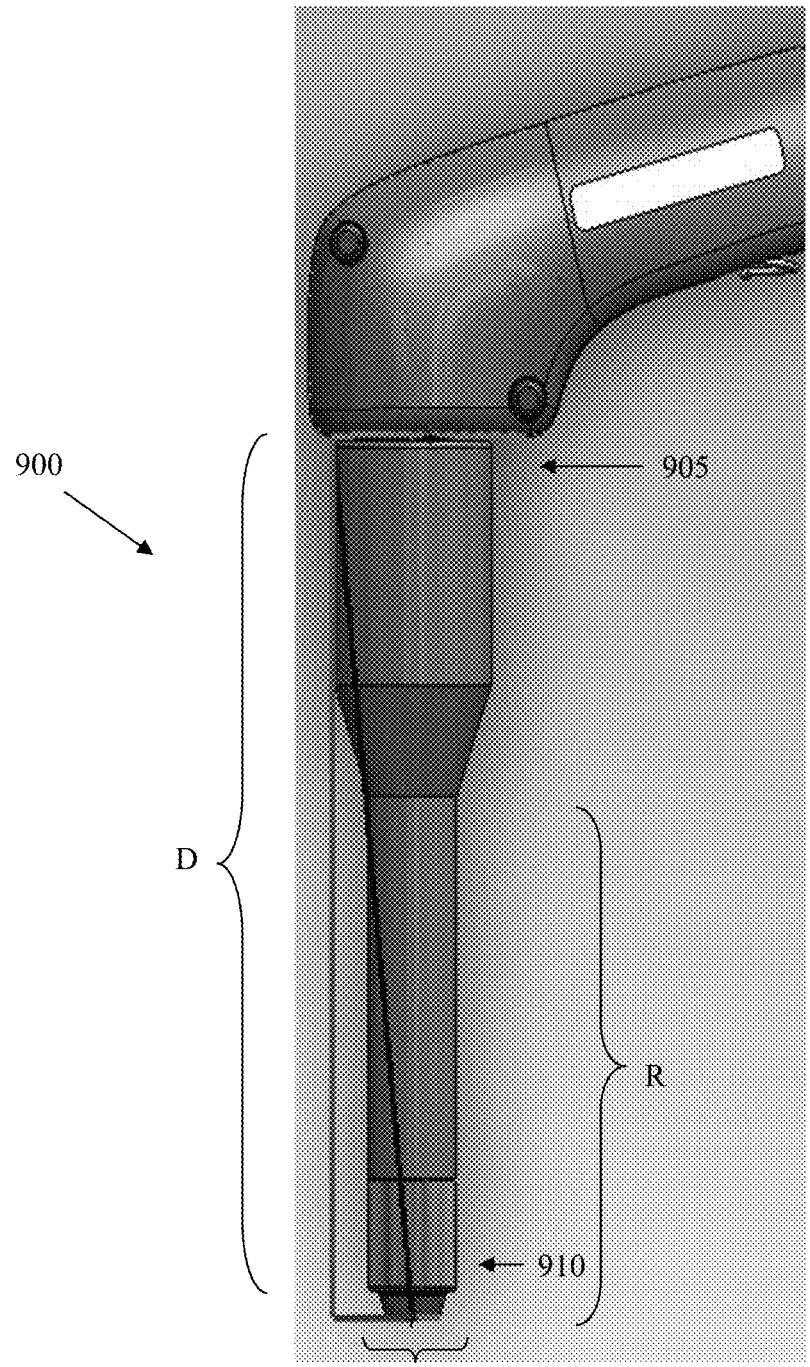
FIG. 9 is an illustration of a torch tip, according to an illustrative embodiment of the invention.

FIG. 9 shows a torch tip 900. The torch tip 900 includes an extended/elongated electrode, nozzle, and retaining cap. These extended consumables add length to the torch tip 900. For example, the extended consumables can add about 2.5 inches to standard, prior art consumables. Therefore, the distance D from the proximal end 905 to the distal end 910 of the torch tip 900 can be about 4.75 inches. The width W of the torch tip 900 can be about 0.56 inches. The small outer diameter W can allow the torch tip to reach into tight spaces. The ratio of the distance D to the width W of the torch tip 900 (4.75/0.56) is about 8.48.

The thin outer diameter or width W also increases the reach angle R of the plasma arc torch when compared to prior art torches. The reach angle R is the angle created by the widest width of the consumables and the length of the consumables as measured from a longitudinal axis of the consumables. The reach angle can be less than about 20°, less than about 15°, less than about 10° or less than about 6°.

Figure 10:
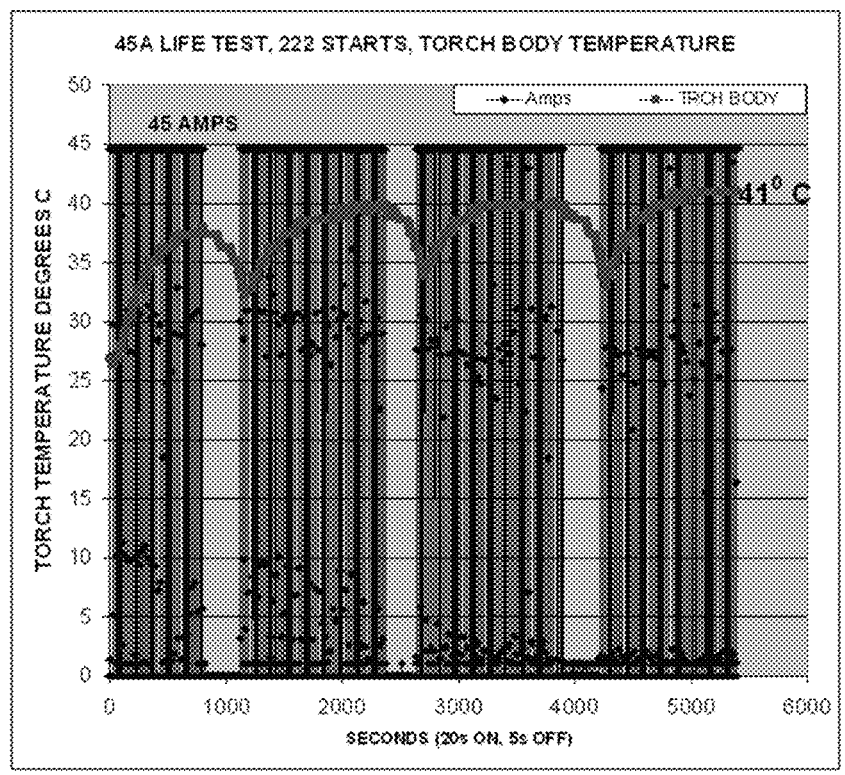
FIG. 10 is a graph showing torch body temperature versus time, according to an illustrative embodiment of the invention.
Figure 11:
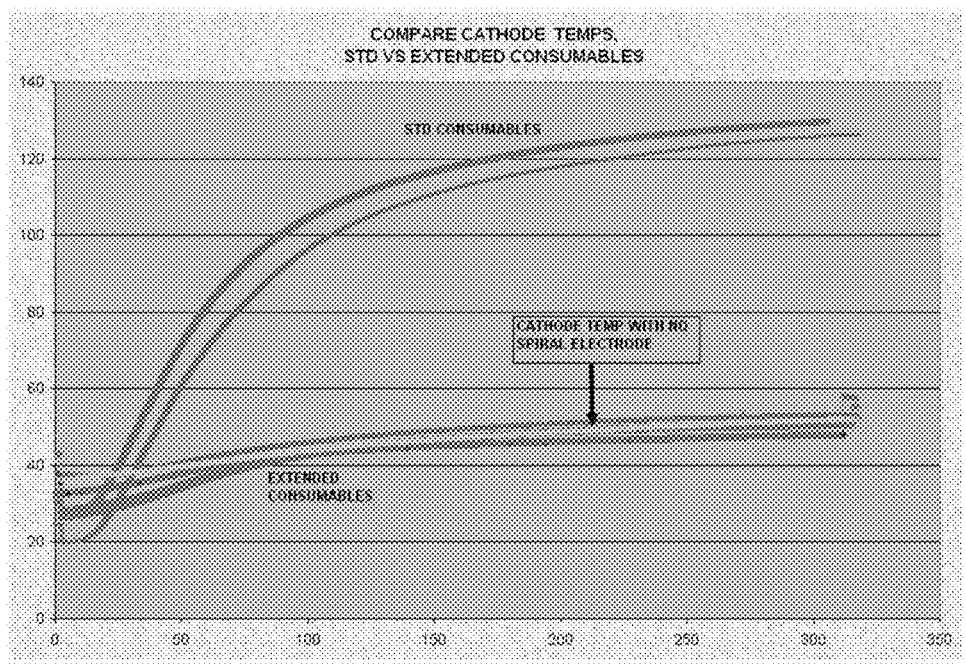
FIG. 11 is a graph showing cathode temperatures versus time, according to an illustrative embodiment of the invention.

FIGS. 10 and 11 are graphs that show how using the extended consumables with the forward flow methods described herein decrease the temperature of the plasma arc torch during operation. For example, FIG. 10 shows the torch temperature in degrees Celsius versus time during operation of a plasma arc torch at 45 Amps. The plasma arc torch was operated for 20 seconds and then shut off for five seconds. This was repeated 222 times. The large vertical gaps indicate a change in the consumable set. As shown on the graph, the highest temperature incurred by the torch body and consumables is 41° C. Prior art consumables typically reach temperatures in excess of 120° C.

FIG. 11 is a graph comparing the temperature of standard consumables to the extended consumables used with the forward flow methods described herein for a plasma arc torch operating at 30 Amps. The standard consumables reach temperatures in excess of 120° C. The highest temperature reached by the extended consumables is 54° C.

The heat transfer of the forward flow design of the consumables that provides such drastic temperature reduction in the plasma arc torch can be expressed by EQNS. 1-3, where Q is the heat into the electrode and nozzle caused by the electrical arc, A is the total (electrode and nozzle) heat transfer surface, $h_{AVG}$ is the heat transfer coefficient of the heat exchange surfaces of the electrode and nozzle, $T_{SURFACE}$ is the local surface temperature of the heat exchange surface and $T_b$ is the local bulb temp of gas (air).

$$Q = A h_{AVG} \Delta T \qquad \text{EQN. 1}$$

$$A = A_{ELECTRODE} + A_{NOZZLE} \qquad \text{EQN. 2}$$

$$\Delta T = T_{SURFACE} - T_b \qquad \text{EQN. 3}$$

Figure 12:
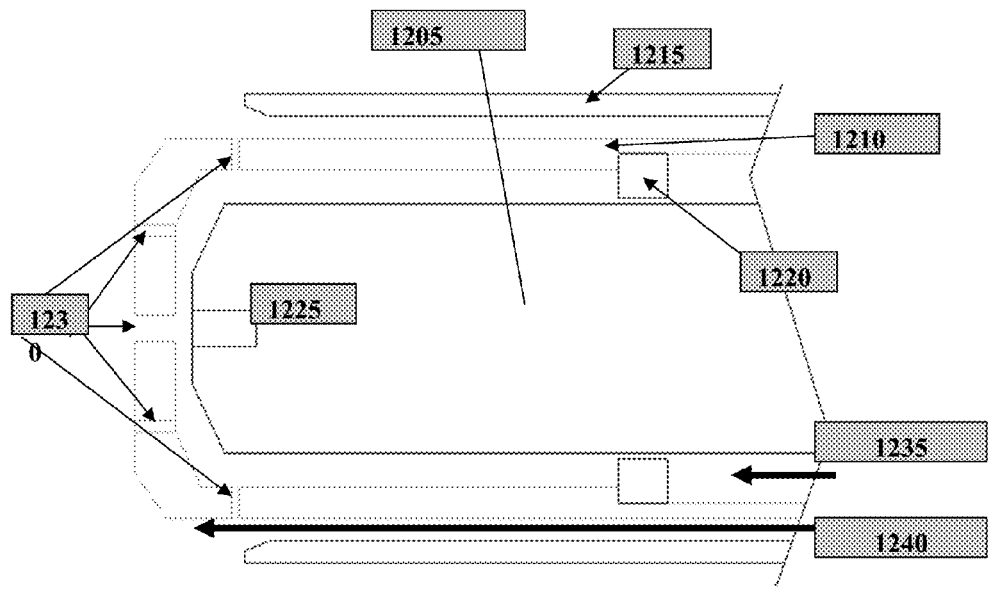
FIG. 12 is a cross-sectional view of a torch tip showing gas flow, according to an illustrative embodiment of the invention.

FIG. 12 shows a torch tip 1200 including an electrode 1205, a nozzle 1210, a shield 1215, and a swirl ring 1220. The electrode 1205 has an insert 1225, e.g., hafnium. The nozzle 1210 includes gas exits 1230. Cooling gas (e.g., air) 1235 can flow between the electrode 1205 and the nozzle 1210 and shield gas 1240 can flow between the nozzle 1210 and the shield 1215. The cooling gas 1235 and the shield gas 1240, in combination, cool the consumables at the torch tip.

Figure 13:
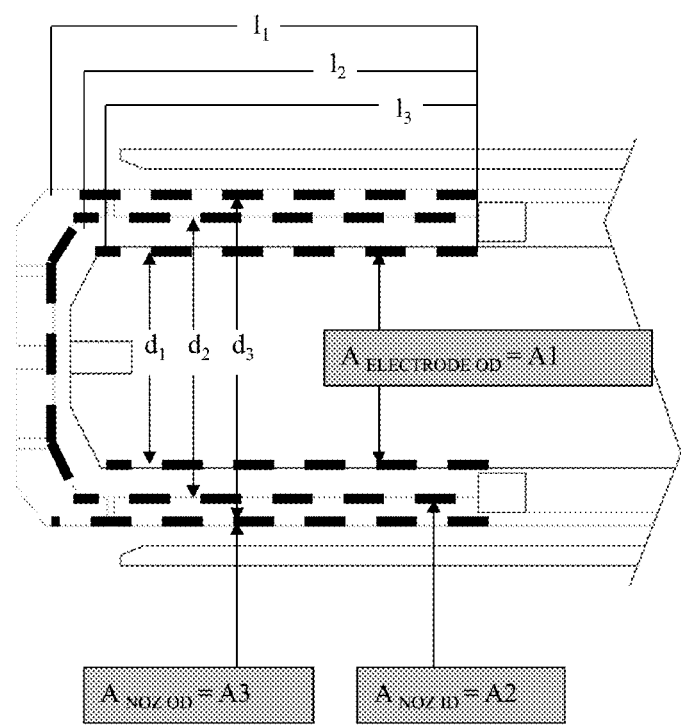
FIG. 13 is a cross-sectional view of a torch tip showing nozzle and electrode diameters and lengths, according to an illustrative embodiment of the invention.

Referring to FIG. 13, the total area of the electrode and nozzle that is the heat transfer area can be calculated based on EQNS. 4-7, where d is the diameter and l is the length.

$$A_1 = \pi d_1 l_1 = A_{Electrode\ Surface} \qquad \text{EQN. 4}$$

$$A_2 = \pi d_2 l_2 = A_{nozzle\ ID\ Surface} \qquad \text{EQN. 5}$$

$$A_3 = \pi d_3 l_3 = A_{nozzle\ OD\ Surface} \qquad \text{EQN. 6}$$

$$A = A_1 + A_2 + A_3 \qquad \text{EQN. 7}$$

Figure 14:
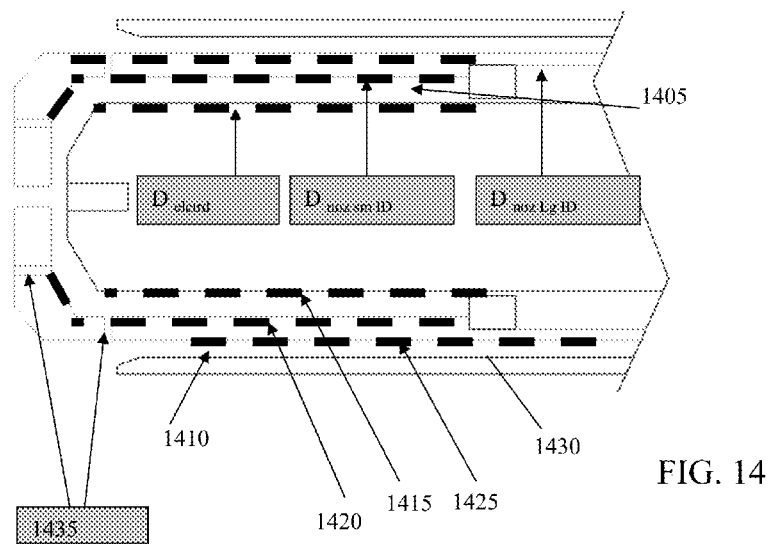
FIG. 14 is a cross-sectional view of a torch tip, according to an illustrative embodiment of the invention.

Referring to FIG. 14 and EQN. 1, there are several factors that should be taken into consideration when calculating $h_{AVG}$. First, the dimension of the gap 1405 between the nozzle inner diameter and the electrode. For example, if the diameter of the small nozzle inner diameter minus the diameter of the electrode is less than the diameter of the large nozzle inner diameter minus the diameter of the electrode (see, e.g., EQN. 8 in conjunction with FIG. 14) then a pressure drop will be created across the swirl ring that can affect the velocity and pressure of the cooling gas.

$$(D_{noz\ sm\ ID} - D_{elctrd}) < (D_{noz\ lg\ ID} - D_{elctrd}) \qquad \text{EQN. 8}$$

In addition, the dimension of the gap 1410 between the outer diameter of the nozzle and the shield can affect the velocity and pressure of the shield gas. Any heat exchanging features on any of the heat exchanging surfaces (outer surface of the electrode 1415, inner or outer surface of the nozzle 1420, 1425 respectively, or inner surface of the shield 1430) can create turbulence and shrink the boundary layer to increase convection in the cooling gas flow and/or shield gas flow. Moreover, the exit holes 1435 can affect the boundary layer and turbulence of the cooling gas based on the diameter and location of the exit holes 1435. Gravity and gas properties of the cooling and shield gas can also be taken into consideration when calculating $h_{AVG}$.

Figure 15:
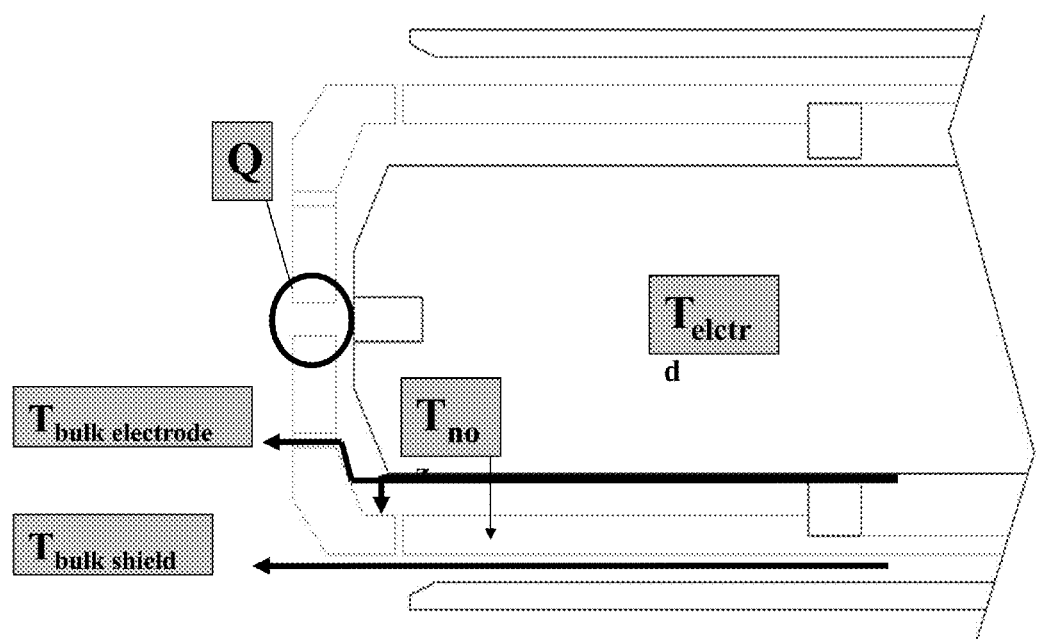
FIG. 15 is a cross-sectional view of a torch tip, according to an illustrative embodiment of the invention.

Referring to FIG. 15, the heat into the electrode and nozzle caused by the electrical arc can also be calculated by EQN 9.

$$Q = A_1 h_1 (T_{elct} - T_{bulk\ elctrd}) + A_2 h_2 (T_{noz} - T_{bulk\ elctrd}) + A_3 h_3 (T_{noz} - T_{bulk\ shield}) \qquad \text{EQN. 9}$$

Although the embodiments of the present invention are described in relation to a hand held plasma arc torch, the embodiments are equally applicable to a mechanized torch. One of ordinary skill in the art would readily understand that designing consumables and flow characteristics can be applied to both hand held and mechanized torches.

Methods of cutting workpieces and extending the life of the plasma arc torch can be performed using any of the consumables (e.g., at least one of the nozzle or electrode embodiments) and forward flow cooling methods described herein. The methods can be performed by providing a plasma arc torch that has a body. The body includes a flow path for directing a plasma gas through a swirl ring to a plasma chamber to form a plasma arc. Any one or multiple consumable embodiments described herein can be provided. For example, the nozzle of FIG. 2 can be provided, the nozzle assembly of FIG. 6 can be provided, or the electrode of FIG. 3 can be provided. In some embodiments, both the nozzle of FIG. 2 and the electrode of FIG. 3 can be provided or the nozzle assembly of FIG. 6 and the electrode of FIG. 3 can be provided.

The plasma arc torch can be operated at an amperage level of at least about 15 Amps. In some embodiments, the plasma arc torch is operated at an amperage level of at least about 30 Amps, at least about 45 Amps, at least about 60 Amps, at least about 80 Amps, at least about 100 Amps, at least about 120 Amps, at least about 150 Amps, or at least about 200 Amps.

The methods also include flowing substantially (e.g., greater than about 95%) of a cooling gas through at least one supplemental orifice at a distal end of a torch body (e.g., the supplemental orifices of the nozzle).

Figure 16:
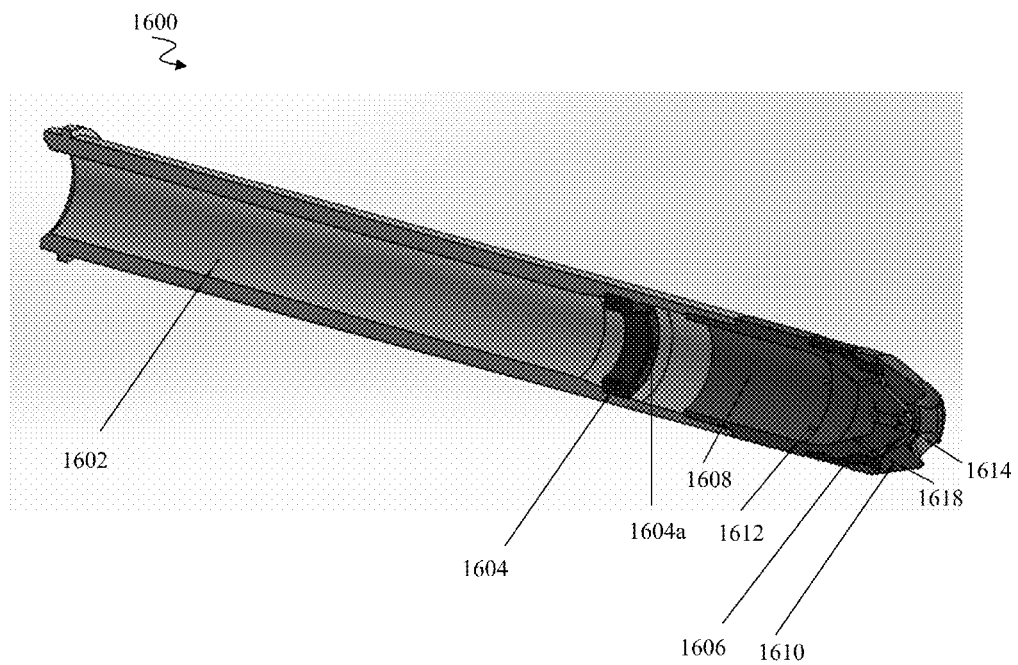
FIG. 16 shows an exemplary consumable composite nozzle that incorporates at least five different torch components.

According to another aspect of the present technology, several traditional torch components can be redesigned, combined, and/or eliminated to form one or more cartridge-type, consumables of a plasma arc cutting system. FIG. 16 shows an exemplary consumable composite nozzle 1600 that incorporates at least five different torch components including a nozzle body 1602, a swirl sleeve 1604, an insulator 1606, a nozzle tip 1608 and a nozzle shield 1610.

In some embodiments, the five components of the nozzle 1600 are press fit together to form the nozzle 1600. This allows for efficient manufacture and assembly of the components, improved durability of the nozzle 1600 via the press fit connection, and promotes proper orientation of components relative to one another. Enhanced cooling of the nozzle 1600 can also be achieved using the press fit arrangement. The press fit arrangement can provide improved gas flow surfaces. The press fit arrangement can also simplify manufacture and/or assembly of the components (e.g. by not requiring many features to implement, as a threaded connection would). The press fit arrangement can provide improved thermal conduction paths between the different components of the nozzle 1600 as a result of the components' relative tight tolerances and/or closeness of the interfering surfaces. The press fit arrangement can include an interference fit or a tabbed/interlocking fit, including step-like features. The small size of the press fit arrangement can enable reduced manufacturing and/or material costs. In some embodiments, at least one of the components of the nozzle 1600 is molded or formed via a molding process. In some embodiments, the components of the nozzle 1600 are threaded to allow operators to connect them. In some embodiments, the nozzle 1600 is configured as a heat sink for the plasma arc torch.

Figure 17:
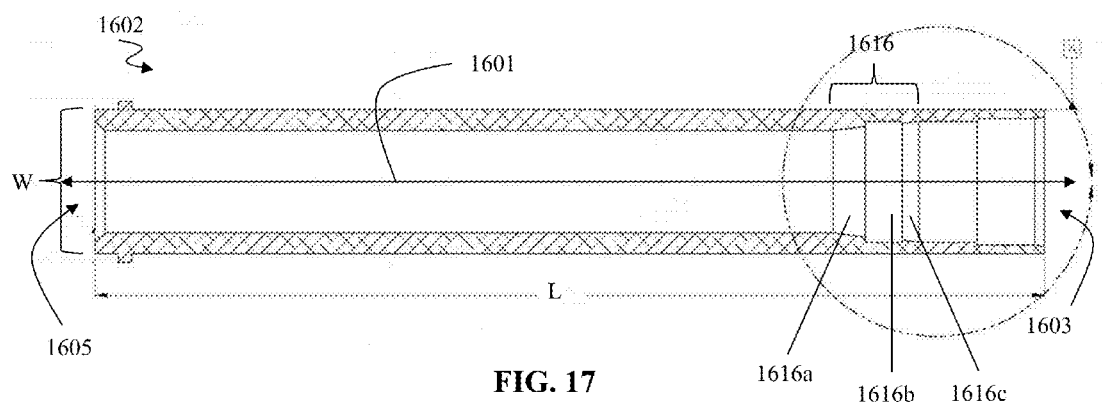
FIG. 17 shows an embodiment of the nozzle body of the composite nozzle of FIG. 16.

FIG. 17 shows an embodiment of the nozzle body 1602 of the composite nozzle 1600 of FIG. 16. The nozzle body 1602 can comprise a conductive material body, such as copper or aluminum. In some embodiments, using aluminum for the nozzle body 1602 enhances cooling performance over traditional materials because aluminum has a high thermal conductivity by comparison to traditional materials (e.g. Vespel). By passing a cold gas over the aluminum nozzle body 1602, significantly better cooling of the nozzle tip 1608 and the attached electrode (not shown) can be realized. In addition, since Vespel can be much more expensive than aluminum, replacing Vespel with aluminum can reduce manufacturing costs of the nozzle 1600. In some embodiments, aluminum is a better choice for the nozzle body 1602 than copper because even though copper is more conductive than aluminum, it also a more expensive material. Hence, to reduce cost, a highly conductive material can be used only in areas that experience the most amount of heat during torch operation, such as in the nozzle tip 1608 or the nozzle shield 1610. Therefore, using aluminum for the nozzle body 1602 represents an ideal balance between cost and function.

As shown in FIG. 17, the nozzle body 1602 defines a longitudinal axis 1601 from a proximal end 1603 (i.e., the end closest to the nozzle shield 1610 after assembly) to a distal end 1605 opposite of the proximal end 1603. The nozzle body 1602 has a length (L) of about 2.5 to about 3 inches along the longitudinal axis 1601 and a cross-sectional width (W) of about 0.4 to about 0.5 inches. The swirl sleeve 1604 can be attached to an interior surface of the nozzle body 1602. For example, the swirl sleeve 1604 can slide into the nozzle body 1602 from the proximal end 1603 and form an interference fit with the nozzle body 1602 at a step region 1616 disposed on the interior surface of the nozzle body 1602. As shown in FIG. 17, the step region 1616 can comprise three portions, a first portion 1616a closest to the distal end 1605, a third portion 1616c closest to the proximal end 1603, and a second portion 1616b between the first and third portions 1616a, 1616c. The cross-sectional width of the second portion 1616b can be larger than the cross-sectional width of the first portion 1616a. The cross-sectional width of the third portion 1616c can be substantially the same as or larger than the cross-sectional width of the second portion 1616b. During assembly, the swirl sleeve 1604 can slide through the third portion 1616c from the proximal end 1603 and form an interference fit with the second portion 1616b. The swirl sleeve 1604 is prevented from further axial advancement toward the distal end 1605 due to the narrower cross-sectional width of the first portion 1616a.

Figure 18:
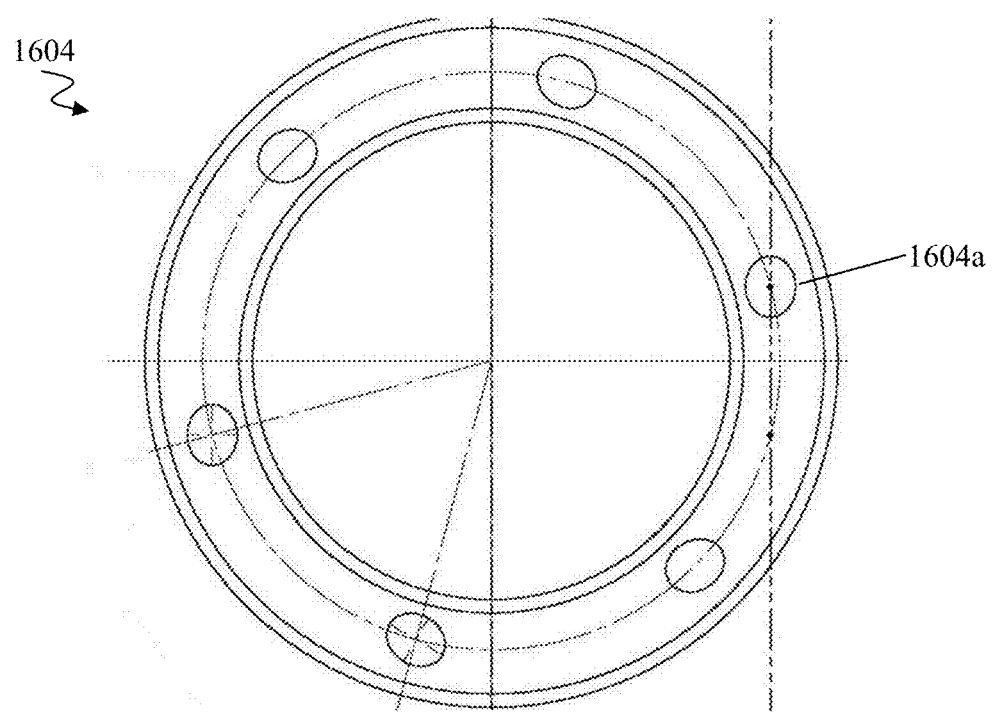
FIG. 18 shows an embodiment of the swirl sleeve of the composite nozzle of FIG. 16.

FIG. 18 shows an embodiment of the swirl sleeve 1604 of the composite nozzle 1600 of FIG. 16. The swirl sleeve 1604 can include a set of one or more swirl holes 1604a (e.g., six swirl holes) that are radially offset to impart a swirl motion (e.g. radial and tangential velocity components) to gases flowing therethrough (e.g., a shield gas, plasma gas, and/or a plenum gas). The swirl sleeve 1604 can perform a swirling function previously provided by a separate swirl ring. Thus, the need for a separate swirl ring can be eliminated. The swirl sleeve 1604 can be manufactured from a conductive material, such as copper. The length of the swirl sleeve 1604 along the longitudinal axis 1601 can be about 0.11 to about 0.12 inches and the cross-sectional diameter of the swirl sleeve 1604 can be substantially the same as cross-sectional width of the second portion 1616b of the step region 1616 of the nozzle body 1602.

Figure 19:
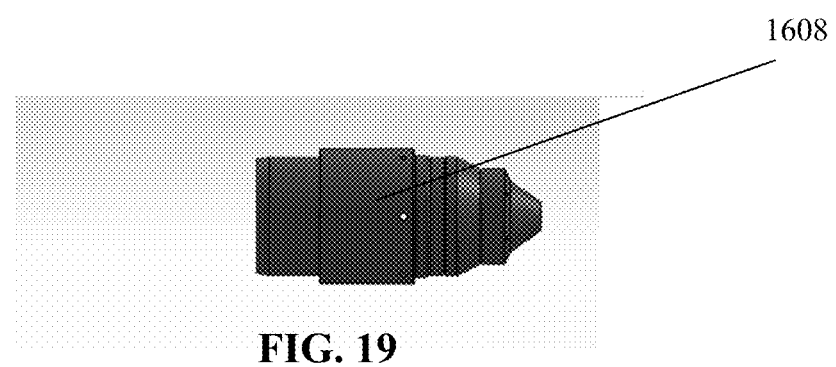
FIG. 19 shows an embodiment of the nozzle tip of the composite nozzle of FIG. 16.

FIG. 19 shows an embodiment of the nozzle tip 1608 of the composite nozzle 1600 of FIG. 16. The nozzle tip 1608 can be made of a conductive material (e.g., copper) since it is exposed to large thermal gradients during torch operation. As shown in FIG. 19, the nozzle tip 1608 can be shorter than the nozzle body 1602 to minimize copper usage in the nozzle tip 1608 and/or increase usage of a cheaper material (e.g., aluminum) in the elongated nozzle body 1602. For example, the length of the nozzle tip 1608 can be about ½, ⅓ or ¼ the length of the nozzle body 1602. In general, the composite nozzle 1600 functions similarly to a prior art nozzle comprising mostly of copper, but the composite nozzle 1600 is more cost effective to produce and has reduced weight that improves maneuverability of the torch tip.

Figure 20:
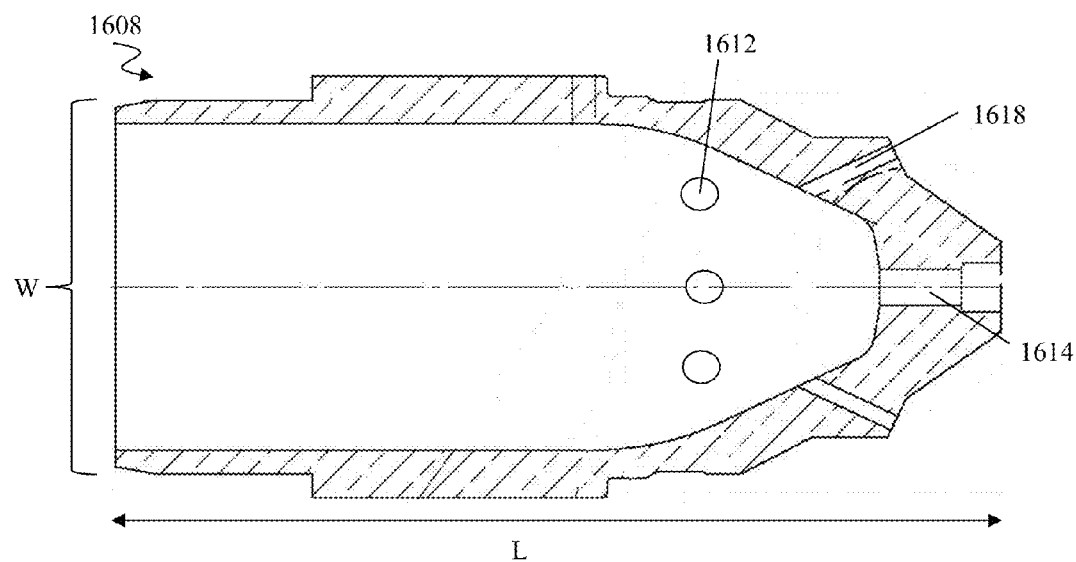
FIG. 20 shows another embodiment of the nozzle tip.

FIG. 20 shows another embodiment of the nozzle tip 1608. As shown, the nozzle tip 1608 includes a set of one or more vent holes 1612 and/or a set of one or more vent channels 1618 that fluidly connect the interior of the nozzle 1600 to the exterior of the nozzle 1600. The exterior of the nozzle 1600 may be ambient environment and the interior of the nozzle 1600 may be the inside of the shield 1610. Functions of the vent holes 1612 and vent channels 1618 are explained below with respect to FIG. 23. In addition, the nozzle tip 1608 includes a nozzle exit orifice 1614 for introducing a plasma arc to a workpiece. As shown in FIG. 20, the nozzle tip 1608 can have a length (L) along the longitudinal axis 1601 of about 0.9 to about 1 inches and a cross-sectional width (W) of about 0.37 to about 0.4 inches.

Figure 21:
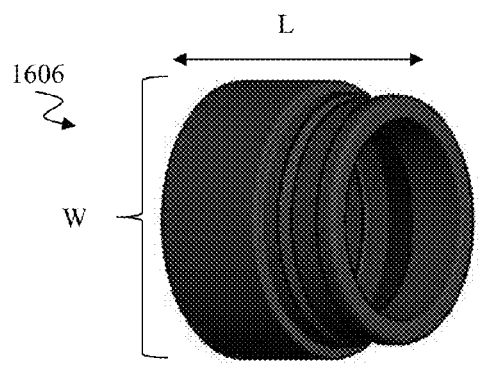
FIG. 21 shows an embodiment of the insulator of the composite nozzle of FIG. 16.

FIG. 21 shows an embodiment of the insulator 1606 of the composite nozzle 1600 of FIG. 16. The insulator 1606 can be an electrically insulating ring configured to connect the nozzle shield 1610 to the nozzle tip 1608. The electrically insulating ring can include a set of press-fit surfaces (e.g., one for the nozzle tip 1608 and one for the nozzle shield 1610). Hence, the shield 1610 can be press fit onto the insulator 1606, which can be press fit onto the nozzle tip 1608. The electrically insulating ring 1606 can connect the nozzle tip 1608 to the shield 1610 such that the nozzle tip 1608 and the shield 1610 are electrically insulated from one another while still transferring thermal energy to one another. In some embodiments, the insulator 1606 is a two-piece insulator (not shown) that can increase (e.g. double) electrical insulation abilities as a result of increased contact surfaces. In some embodiments, the insulator 1606 is made of anodized aluminum and/or plastic. As shown in FIG. 21, the insulator 1606 can have a length (L) of about 0.3 to about 0.4 inches along the longitudinal axis 1601 and a largest cross-sectional width (W) of about 0.4 to about 0.5 inches.

In some embodiments, the anodized layer of the insulator 1606 can be created using a hard anodizing technique. For example, an anodized layer can be formed using a sulfuric hard anodizing process based on an electrolytic solution of sulfuric acid that is maintained at approximately 32 degrees Fahrenheit and a current density of about 23 to 37 Amperes per square foot. The process can run for about 20 to 120 minutes, depending on the alloy used and the desired coating thickness. A coating having a thickness of about 10 to 50 microns can be produced. This hard anodize coating can provide high corrosion resistance (e.g., 336+ hours salt spray resistance), high durability (e.g. 60-70 Rockwell C-scale rating), and electrical insulation (e.g. 800 V/mil thickness). The hard anodize coating can be dyed, which does not necessarily produce the vibrant colors that a sulfuric anodize produces.

The anodizing process can provide a surface conversion of Aluminum to $Al_2O_3$. The anodizing process can provide a hard dielectric shell of about 0.003 inches thick (including both 50% build up (e.g. deposits on the part) and 50% penetration (e.g. material change to the exposed surfaces of the component). The hard dielectric shell can provide good atmospheric corrosion resistance. For extreme environments a 5% dichromate solution sealing is recommended, which can produce fair abrasion resistance. In some embodiments, a plurality of anodized disks can be pressed or heat shrunk together. Using a plurality of disks can create adjustable electrical isolation, e.g. because each disk increases electrical isolation linearly (via each coating/layer introduced by the new surfaces of each disk). By using multiple layers, electrical isolation capability can be made very strong. For example, by using the insulator 1606, the copper parts (e.g., the nozzle tip 1608 and/or the nozzle shield 1610) can be electrically isolated with a safety factor of 4. In some embodiments, plastics, ceramics, lava, or Vespel can be used in place of any or all of the anodized portions/components.

Figure 22:
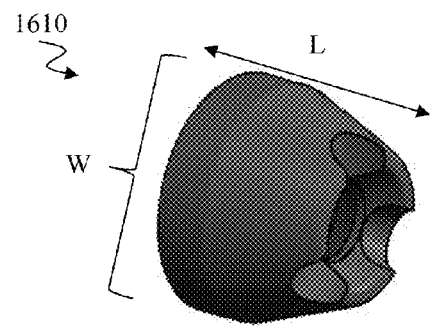
FIG. 22 shows an embodiment of the nozzle shield of the composite nozzle of FIG. 16.

FIG. 22 shows an embodiment of the nozzle shield 1610 of the composite nozzle 1600 of FIG. 16. The nozzle shield 1610 can be made of a conductive material, such as copper. The nozzle shield 1610 can be considerably smaller than previous shields. For example, for a 45-amp system, a prior art stock shield can have a diameter of about one inch (e.g. about 0.990 inches) and a mass of about 0.036 pounds; whereas a nozzle shield 1610 in accordance with the current technology can have a diameter of about a half inch (e.g. 0.496 inches) with a mass of about 0.007 pounds. For a 105-amp system, a prior art stock shield can have a diameter of about one inch (e.g. about 1.00 inches) with a mass of about 0.047 pounds; whereas a nozzle shield 1610 in accordance with the current technology can have a diameter of about a half inch (e.g. 0.58 inches) with a mass of about 0.013 pounds. In general, the smaller size of the nozzle shield 1610 reduces overall mass and thus reduces the heat capacity of the part, allowing rapid cooling during post flow and/or allowing more heat to be transferred to the cooling gas during operation. The nozzle shield 1610 can be exposed to cold gas exiting the torch around the exterior of the shield 1610 (via the vent holes 1612), which can further reduce the temperature. A smaller shield can attain comparatively higher temperatures during operation and can transfer more heat to the cooling gas (e.g. creating a larger temperature gradient). As shown in FIG. 22, the nozzle shield 1610 can have a length (L) along the longitudinal axis 1601 of about 0.25 to about 0.35 inches and a largest cross-sectional width (W) of about 0.4 to about 0.5 inches.

In general, the cartridge-like, composite nozzle 1600 can have enhanced cooling and insulation capabilities (e.g. by increasing heat transfer away from consumable components of the torch), reduced manufacturing and material costs, and/or improved recyclability, durability and performance. The nozzle 1600 can be cost effective for both handheld plasma cutting systems and mechanized plasma cutting systems. The nozzle 1600 integrates many consumable components into one piece, thus enabling a significantly reduced assembly time (e.g. by a factor of 5-10), ensuring that mating parts are chosen correctly for a given cutting task, and/or enabling easier recognition of appropriate consumable components for a given cutting task.

In some embodiments, the nozzle 1600 is elongated to reach difficult-to-access locations. The nozzle 1600 can have a length (L) along the longitudinal axis 1601 and a cross-sectional width (W) along an axial direction such that the L/W ratio is greater than or equal to about 3. In some embodiments, the length $L_1$ of the nozzle tip 1608 along the longitudinal axis is about 25% of the overall length L of the nozzle 1600. Alternatively, the length $L_1$ of the nozzle tip 1608 comprises about 20%, 30%, or 40% of the overall length L of the nozzle 1600. In some embodiments, the length $L_2$ of the nozzle body 1602 is about 2-3 times greater than the length $L_1$ of the nozzle tip 1608. In general, the nozzle 1600 can be cartridge-like in that it can be made up of five components that are not separately serviceable, but replaceable as a whole. The nozzle 1600 can comprise the nozzle body 1602, the nozzle tip 1608, the swirl sleeve 1604, the nozzle shield 1610, and the insulator 1606.

Figure 23:
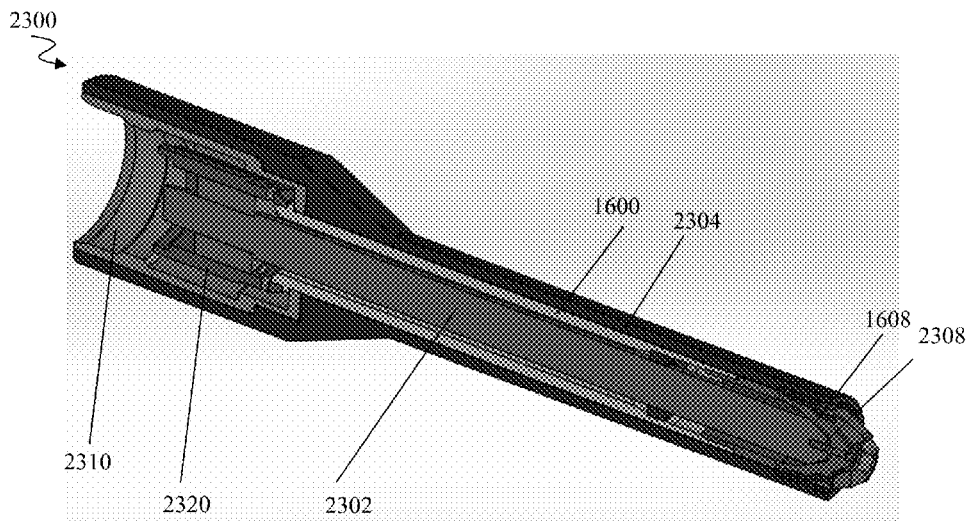
FIG. 23 shows an exemplary plasma arc torch assembly including the composite nozzle of FIG. 16.

FIG. 23 shows an exemplary plasma arc torch assembly 2300 including the composite nozzle 1600 of FIG. 16. When fully assembled, the nozzle 1600 substantially surrounds an electrode 2302. A retaining cap 2304 can substantially surround the nozzle 1600 to maintain the nozzle 1600 in the torch assembly 2300. A part 2310, made of brass, for example, can be integrated with the retaining cap 2304 via threading. The retaining cap 2304, coupled to the part 2310, is configured to receive the electrode 2302, the composite nozzle 1600, and an optional rear insulating component 2320 (e.g., an optional swirl ring). In addition, threaded portions (not shown) can be disposed on the assembly 2300 to couple the assembly 2300 (representative of a torch tip) onto a plasma arc torch. In a "blow-back" contact start mode of operation of the torch, gas pressure can cause the electrode 2302 to move within the nozzle 1600 away from the nozzle tip 1608. The separation causes an arc to be formed between the electrode 2302 and the nozzle tip 1608. The arc ionizes the introduced gas to produce a plasma jet that can be transferred to a workpiece for material processing. The wall of the nozzle 1600, near which the electrode 2302 moves, can stay comparatively cool during operation because gas flow passes both on the inside of the nozzle 1600 and over the exterior surface of the nozzle 1600. The material choice (e.g., a composite of aluminum and copper) of the nozzle 1600 provides for a better conduction path/heat sink when compared to previously used materials (e.g., Vespel). These effects assist in cooling the electrode 2302 and allow the electrode 2302 to function even after a deep pit is formed in the emitting element 2308 from electrode use.

Figure 24:
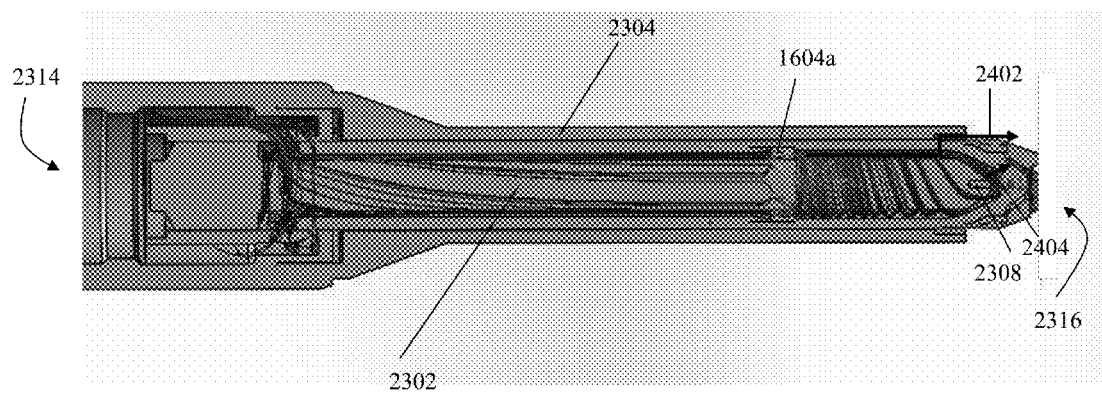
FIG. 24 shows an exemplary gas flow pattern through the plasma arc torch assembly of FIG. 23.

FIG. 24 shows an exemplary gas flow pattern through the plasma arc torch assembly 2300 of FIG. 23. As shown, a flow of gas can generally travel from the distal end 2314 of the assembly 2300 toward the proximal end 2316, where the emissive element 2308 is located. The flow of gas can be multi-functional, used as a shield gas and/or a plasma gas. The swirl holes 1604a of the swirl sleeve 1604 are configured to introduce additional swirl to the gas flow. A portion 2402 of the gas flow can be vented to ambient from the interior of the nozzle 1600 through the retaining cap 2304 via the vent holes 1612 of the nozzle tip 1608. This gas portion 2402 can cool the nozzle 1600 and the exterior of the shield 1610, provide stability to the plasma arc generated and remove dross from the workpiece. Another portion 2404 of the gas flow can be directed from the interior of the nozzle 1600 to the nozzle shield 1610 as shield gas via the vent channels 1618 of the nozzle tip 1608. Yet another portion of the gas flow (not shown) can function as a plasma gas and can be ionized by an electrical current to generate a plasma arc for processing a workpiece via the nozzle exit orifice 1614. In some embodiments, the gas flow portions 2402 and 2404 slow the swirling motion of the gas in the nozzle tip 1608.

Figure 25:
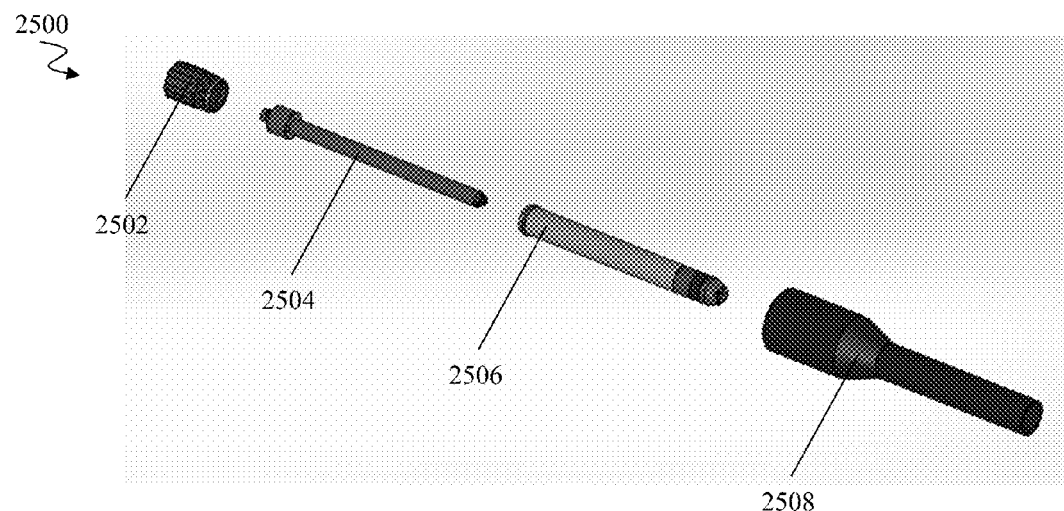
FIG. 25 shows an exploded view of consumable parts of another exemplary plasma arc torch assembly.

FIG. 25 shows an exploded view of consumable parts of another exemplary plasma arc torch assembly 2500. To configure the plasma arc torch assembly 2500, an optional insulating component or swirl ring 2502 (similar to the insulating component 2320 of FIG. 23) can be fitted through an electrode 2504 (similar to the electrode 2302 of FIG. 23) to substantially surround an exterior surface portion of the electrode 2504. The resulting combination of the two components can be inserted into a nozzle 2506 (similar to the nozzle 1600 of FIGS. 16 and 23). The resulting combination of the three components can be further inserted into a retaining cap 2508 (similar to the retaining cap 2304 of FIG. 23) to complete the assembly 2500.

Figure 26:
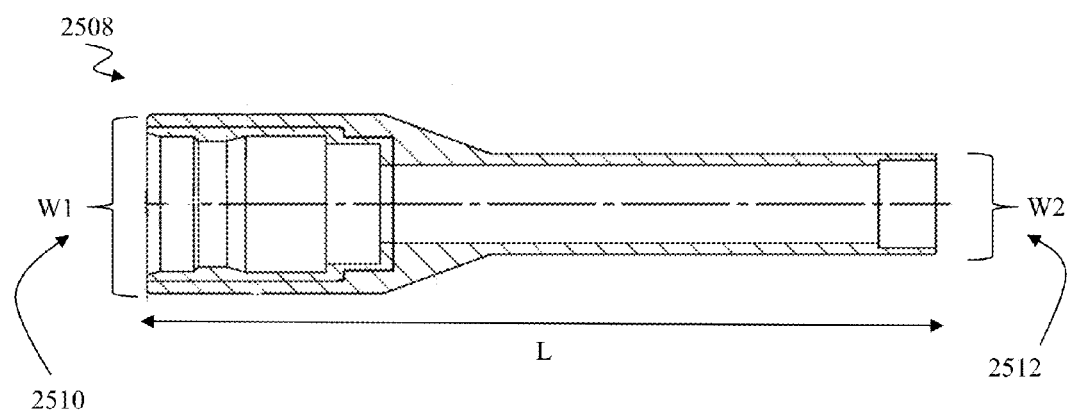
FIG. 26 shows an exemplary view of the retaining cap of FIG. 25.

FIG. 26 shows an exemplary view of the retaining cap 2508 of FIG. 25. The retaining cap 2508 can be substantially similar to the retaining cap 2304 of FIG. 23. The retaining cap 2508 can have a length (L) of about 4.5-5.5 inches, a first cross-sectional width (W1) of about 1 inch when measured at the distal portion 2510 of the retaining cap 2508 (i.e., the portion that is configured to attach to the plasma arc torch), and a second cross-sectional width (W2) of 0.5 inches when measured at the proximal portion 2512 of the retaining cap 2508 (i.e., the portion opposite of the distal portion 2510). The retaining cap 2508 can have a length-to-first-width ratio (L/W1) of greater than 3 or greater than 4 (e.g., 4.5) when the first width is measured at the widest point of the cross-sectional width near the distal portion 2510 of the retaining cap 2508. The retaining cap 2508 can have a length-to-second-width ratio (L/W2) of greater than 5, 6, 7, 8 or 9 when the second width is measured at the proximal portion 2512. In some embodiments, the retaining cap 2508 is relatively elongated and/or small in the cross section to reach difficult-to-access locations.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A nozzle for a plasma arc torch, the nozzle comprising:
a substantially hollow, elongated nozzle body capable of receiving an electrode, the body defining a longitudinal axis, a distal end, and a proximal end, wherein the nozzle body includes a distal portion having a first internal cross-sectional width and a proximal portion having a second internal cross-sectional width, the second internal cross-sectional width larger than the first internal cross-sectional width;
a nozzle tip connected to the proximal end of the nozzle body, the nozzle tip including a nozzle exit orifice for introducing a plasma arc to a workpiece, the nozzle body and the nozzle tip defining a conductive joint therebetween;
a swirl sleeve configured to impart a swirling motion to a gas introduced to the nozzle; wherein the first internal cross-sectional width of the nozzle body and the nozzle tip cooperate to retain the swirl sleeve therebetween, preventing distal axial movement of the swirl sleeve;
a nozzle shield; and
an insulator configured to connect the nozzle tip and the nozzle shield and to electrically insulate the nozzle shield and the nozzle tip from one another while transferring thermal energy therebetween.

2. The nozzle of claim 1, wherein the nozzle body, the swirl sleeve, the nozzle tip, the nozzle shield and the insulator are connected via press fit.

3. The nozzle of claim 1, wherein the nozzle comprises a single consumable component of the plasma arc torch.

4. The nozzle of claim 1, wherein at least one of the nozzle body, the swirl sleeve, the nozzle tip or the nozzle shield comprises a conductive material.

5. The nozzle of claim 1, wherein the nozzle body comprises aluminum.

6. The nozzle of claim 1, wherein the nozzle body has a length along the longitudinal axis of about 2.5 to 3 inches and a cross-sectional width of about 0.4 to about 0.5 inches.

7. The nozzle of claim 1, wherein the swirl sleeve is slideably attached to an intermediate portion between the distal portion and the proximal portion from the proximal end, the intermediate portion having a third internal cross-sectional width.

8. The nozzle of claim 7, wherein the third cross-sectional width is larger than the first cross-sectional width and the second cross-sectional width is larger than the third cross-sectional width.

9. The nozzle of claim 1, wherein the swirl sleeve comprises copper.

10. The nozzle of claim 1, wherein the swirl sleeve has a length of about 0.11 to about 0.12 inches along the longitudinal axis.

11. The nozzle of claim 1, wherein the nozzle tip comprises copper.

12. The nozzle of claim 1, wherein the nozzle tip is about ½, ⅓ or ¼ the length of the nozzle body along the longitudinal axis.

13. The nozzle of claim 1, wherein the nozzle tip is about 20%, 30% or 40% the length of the nozzle along the longitudinal axis.

14. The nozzle of claim 1, wherein the nozzle tip has a length of about 0.9 to about 1 inch along the longitudinal axis and a cross-sectional width of about 0.37 to about 0.4 inches.

15. The nozzle of claim 1, wherein the insulator comprises at least one of anodized aluminum or plastic.

16. The nozzle of claim 1, wherein the insulator has a length of about 0.3 to about 0.4 inches along the longitudinal axis and a largest cross-sectional width of about 0.4 to about 0.5 inches.

17. The nozzle of claim 1, wherein the nozzle shield comprises copper.

18. The nozzle of claim 1, wherein the nozzle shield has a length of about 0.25 to about 0.35 inches along the longitudinal axis and a largest cross-sectional width of about 0.4 to about 0.5 inches.

19. A plasma arc torch assembly comprising:
an electrode,
a composite nozzle configured to substantially surround the electrode, the composite nozzle comprising a nozzle body defining a longitudinal axis, a distal end, and a proximal end, wherein the nozzle body includes a distal portion having a first internal cross-sectional width and a proximal portion having a second internal cross-sectional width, the second internal cross-sectional width larger than the first internal cross-sectional width, a nozzle tip connected to the proximal end of the nozzle body, wherein the nozzle body and the nozzle tip define a conductive joint therebetween, a swirl sleeve, wherein the first internal cross-sectional width of the nozzle body and the nozzle tip cooperate to retain the swirl sleeve therebetween, preventing distal axial movement of the swirl sleeve, a nozzle shield and an insulator interconnected by press fit; and
a retaining cap configured to substantially surround the composite nozzle to maintain the composite nozzle in the plasma arc torch assembly.

20. The plasma arc torch assembly of claim 19, wherein the swirl sleeve comprises at least one swirl hole configured to introduce swirl to a gas in the plasma arc torch assembly.

21. The plasma arc torch assembly of claim 19, wherein the nozzle tip includes a vent hole fluidly connecting the interior of the nozzle to the ambient via the retaining cap, the vent hole configured to direct a first gas flow from the interior of the nozzle to the ambient to perform at least one of cool the nozzle, cool the nozzle shield, provide stability to a plasma arc, or remove dross.

22. The plasma arc torch assembly of claim 21, wherein the nozzle tip includes a vent channel fluidly connecting the interior of the nozzle to the nozzle shield, the vent channel configured to direct a second gas flow from the interior of the nozzle to the nozzle shield as shield gas.

23. The plasma arc torch assembly of claim 22, wherein at least one of the first gas flow or the second gas flow slows the swirling motion of the gas in the nozzle tip.

24. The plasma arc torch assembly of claim 19, further comprising a swirl ring coupled to a distal end of the electrode to substantially surround an exterior surface of the electrode.

25. The plasma arc torch assembly of claim 19, wherein the retaining cap has a length along the longitudinal axis from a retaining cap distal end of the retaining cap to a retaining cap proximal end, the length being about 4.5 to about 5.5 inches, a first width of the retaining cap distal end being about 1 inch, and a second width of the retaining cap proximal end being about 0.5 inches.

26. The plasma arc torch assembly of claim 25, wherein the first width defines the widest cross-sectional width of the retaining cap distal end a ratio of the length to the first width is greater than 3 or 4.

27. The plasma arc torch assembly of claim 25, wherein the second width defines the cross-sectional width of the retaining cap proximal end and a ratio of the length to the second width is greater than 5, 6, 7, 8 or 9.

28. A method for forming a plasma arc torch assembly, the method comprising:
attaching a swirl ring to an electrode to form a first portion, wherein the swirl ring substantially surrounds an exterior surface of the electrode;
inserting the first portion into a composite nozzle to form a second portion, the composite nozzle comprising a nozzle body defining a longitudinal axis, a distal end, and a proximal end, wherein the nozzle body includes a distal portion having a first internal cross-sectional width and a proximal portion having a second internal cross-sectional width, the second internal cross-sectional width larger than the first internal cross-sectional width, a nozzle tip connected to the proximal end of the nozzle body, wherein the nozzle body and the nozzle tip define a conductive joint therebetween, a swirl sleeve configured to impart a swirling motion to a gas introduced to the nozzle, wherein the first internal cross-sectional width of the nozzle body and the nozzle tip cooperate to retain the swirl sleeve therebetween, preventing distal axial movement of the swirl sleeve, a nozzle shield and an insulator interconnected by press fit; and
inserting the second portion into a retaining cap to form the plasma arc torch assembly, the retaining cap configured to substantially surround the second portion for maintaining the second portion in the plasma arc torch assembly.

29. The method of claim 28, further comprising sliding the swirl sleeve into the nozzle body from a proximal end of the nozzle body to form an interference fit with an intermediate portion of the nozzle body between the distal portion and the proximal portion, the intermediate portion having a third cross-sectional width.

* * * * *